(12) United States Patent
Takahashi

(10) Patent No.: US 7,822,331 B2
(45) Date of Patent: Oct. 26, 2010

(54) IMAGE BLUR CORRECTION DEVICE, LENS BARREL AND IMAGING APPARATUS

(75) Inventor: Tatsuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 157 days.

(21) Appl. No.: 12/198,165

(22) Filed: Aug. 26, 2008

(65) Prior Publication Data

US 2009/0060485 A1    Mar. 5, 2009

(30) Foreign Application Priority Data

Aug. 28, 2007    (JP)   ............ P2007-221706

(51) Int. Cl.
     *G03B 17/00*    (2006.01)
     *H04N 5/228*    (2006.01)
     *G02B 27/64*    (2006.01)

(52) U.S. Cl. ............... 396/55; 348/208.11; 359/557

(58) Field of Classification Search ............ 396/55, 396/52; 348/208.99, 208.4, 208.7, 208.11; 359/557

See application file for complete search history.

(56) References Cited

U.S. PATENT DOCUMENTS 5,266,988 A    11/1993    Washisu

2006/0285840 A1*   12/2006   Takahashi ............ 396/55

FOREIGN PATENT DOCUMENTS

| JP | 3 186823 | 8/1991 |
|---|---|---|
| JP | 3 188430 | 8/1991 |
| JP | 7 248522 | 9/1995 |
| JP | 2006 23664 | 1/2006 |
| JP | 2006 191249 | 7/2006 |
| JP | 2006 350157 | 12/2006 |

* cited by examiner

*Primary Examiner*—Rochelle-Ann J Blackman
(74) *Attorney, Agent, or Firm*—Frommer Lawrence & Haug LLP; William S. Frommer; Thomas F. Presson

(57) ABSTRACT

An image blur correction device is provided. The device includes a correction lens, a first movable frame, a second movable frame, a fixed base, a driving part and a guide mechanism. The correction lens is configured to correct an image blur in a lens system. The first movable frame holds the correction lens. The second movable frame supports the first movable frame to be movable in a first direction perpendicular to an optical axis of the lens system. The fixed base supports the second movable frame to be movable in a second direction perpendicular to the optical axis of the lens system and perpendicular to the first direction. The driving part moves the first movable frame in the first direction and moves the second movable frame in the second direction. The guide mechanism has at least one guide shaft guiding both the first movable frame and the second movable frame.

6 Claims, 29 Drawing Sheets

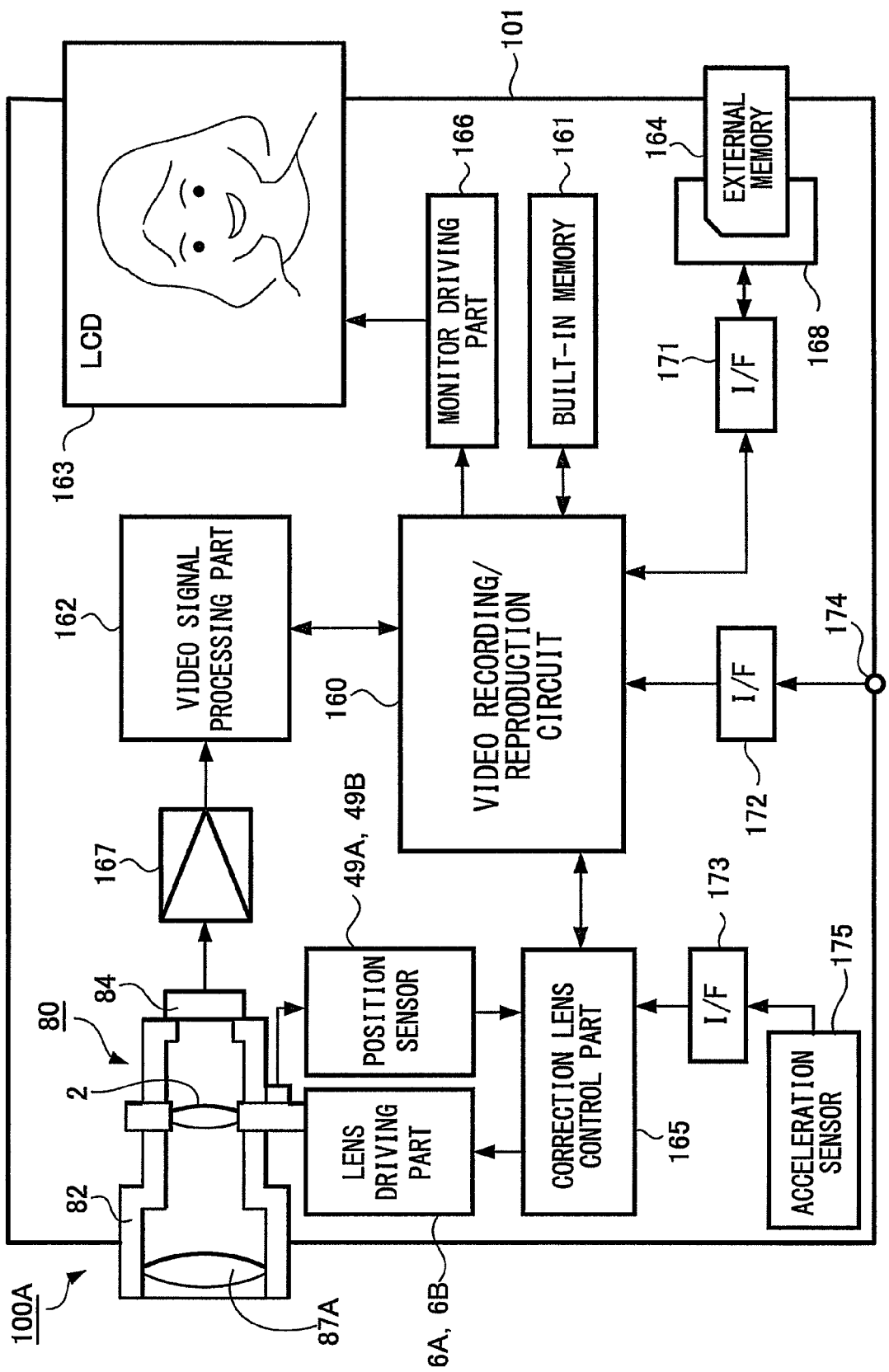

IMAGE BLUR CORRECTION DEVICE, LENS BARREL AND IMAGING APPARATUS

CROSS REFERENCES TO RELATED APPLICATIONS

The present invention contains subject matter related to Japanese Patent Application JP 2007-221706 filed in the Japanese Patent Office on Aug. 28, 2007, the entire contents of which being incorporated herein by reference.

BACKGROUND OF THE INVENTION

1. Field of the Invention

The present invention relates to an image blur correction device correcting an image blur caused by vibration or the like during photographing, a lens barrel having the image blur correction device, and an imaging apparatus such as a digital still camera or video camera having the lens barrel.

2. Description of the Related Art

In recent years, performance of imaging apparatuses such as digital still cameras and video cameras has been remarkably improved, and thus still images and moving images may be easily captured by everyone with high image quality and high performance. Such improvement in performance of imaging apparatuses is largely due to improvement in performance of lenses, imaging devices (such as CCD and CMOS image sensors) and image processing circuits.

However, no matter how much the performance of lenses, imaging devices or the like is improved, a high resolution screen blurs and thus a captured image blurs when hands supporting a camera (imaging apparatus) tremble or shake. Therefore, some relatively expensive cameras have an image blur correction device mounted and correcting an image blur caused by shake or the like during photographing. However, image blur correction may be essentially needed not in high-end models for professional use but rather in popular models used by a majority of the public having only a little photographing experience.

Generally, cameras (imaging apparatuses) are demanded to be reduced in size and weight and are favored to be light and easily carried. However, image blur correction devices of the related art are relatively large. Therefore, when the image blur correction device of the related art is mounted on a camera main body, the camera is large as a whole, contrary to a demand for reduction in size and weight. In addition, an image blur correction device of the related art may need a large number of components and is significantly expensive due to an increase in the number of components, disadvantageously.

Japanese Unexamined Patent Application Publication No. 3-186823 discloses an example of such an image blur correction device of the related art. Japanese Unexamined Patent Application Publication No. 3-186823 discloses a vibration proof device placed in a camera or the like, which detects vibration at a relatively low frequency as information for image blur prevention. The camera vibration proof device disclosed in Japanese Unexamined Patent Application Publication No. 3-186823 (hereinafter referred to as "first related art example") includes: "a correction optical mechanism placed in a lens barrel holding a lens group to make an optical axis of the lens group eccentric; a vibration detection section detecting vibration applied to the lens barrel; and a vibration proof control section driving the correction optical mechanism based on a signal from the vibration detection section to prevent vibration. The correction optical mechanism includes a correction lens; a fixing frame; a first holding frame; a second holding frame; first and second coils; first and second driving sections; and first and second position detection sections. The fixing frame fixes the correction lens. The first holding frame holds the fixing frame to be movable in a first direction differing from a direction of the optical axis of the lens group. The second holding frame is fixed to the lens barrel and holds the first holding frame to be movable in a second direction differing from the optical axis direction and the first direction, respectively. The first and second coils move the first and second holding frames in the first and second directions, respectively. The first and second driving sections include first and second magnetic field generation members facing the first and second coils, respectively. The first and second position detection sections detect amounts of movement of the fixing frame and the first holding frame in the first and second directions, respectively. At least one of the first and second magnetic field generation members and the first and second position detection sections is provided to a fixed member fixed to the lens barrel and including the second holding frame."

According to the vibration proof device disclosed in Japanese Unexamined Patent Application Publication No. 3-186823 having such a configuration, it is expected that "the device may respond to high frequency vibration without necessity to increase the cost and ensure a large space (see the section "Effect of the Invention")."

Japanese Unexamined Patent Application Publication No. 3-188430 discloses another example of an image blur correction device of the related art. Japanese Unexamined Patent Application Publication No. 3-188430 discloses a camera image blur suppression device detecting vibration (shake) at a frequency of about 1 Hz to 12 Hz generated in equipment such as a camera as information to suppress an image blur. The camera image blur suppression device disclosed in Japanese Unexamined Patent Application Publication No. 3-188430 (hereinafter referred to as "second related art example") "determines a correction amount for eccentricity of an optical axis necessary for suppressing an image blur on an image surface based on detected information on vibration generated in a lens barrel and controls movement of a correction optical system floatingly supported to be movable in a diameter direction of the lens barrel according to the correction amount. The floatingly-supported correction optical system includes a first holding frame supporting the correction optical system to be movable in a first direction determined in a plane perpendicular to the optical axis but restraining movement of the correction optical system in other directions; and a second holding frame supporting the first holding frame to be movable in a second direction differing from the first direction in the plane but restraining movement thereof in other directions, the second holding frame fixed to the lens barrel."

According to the camera image blur suppression device disclosed in Japanese Unexamined Patent Application Publication No. 3-188430 having such a configuration, it is expected that "a problem of defocusing may not occur during suppression of an image blur, and the correction optical mechanism may be formed to have a reduced dimension in an optical axis direction, enabling a camera to be reduced in size."

However, the first or second related art example includes four guide shafts in total as essential components, specifically, a pair of pitch shafts (guide shafts) slidably supporting a fixing frame having a correction lens; and a pair of yaw shafts (guide shafts) slidably supporting a first holding frame. Therefore, it may be necessary to ensure a space for placing the four shafts, thus increasing an image blur correction device in size, disadvantageously.

SUMMARY OF THE INVENTION

The present inventors have recognized that when four guide shafts in total are used to guide two movable frames, an image blur correction device is increased in size, thus preventing a reduction in size of a lens barrel or an imaging apparatus including the image blur correction device.

According to an embodiment of the present invention, there is provided an image blur correction device including a correction lens, a first movable frame, a second movable frame, a fixed base, a driving part and a guide mechanism. The first movable frame holds the correction lens. The second movable frame supports the first movable frame to be movable in a first direction perpendicular to an optical axis of the lens system. The fixed base supports the second movable frame to be movable in a second direction perpendicular to the optical axis of the lens system and perpendicular to the first direction. The driving part moves the first movable frame in the first direction and moves the second movable frame in the second direction. The guide mechanism has at least one guide shaft guiding both the first movable frame and the second movable frame.

According to an embodiment of the present invention, there is provided a lens barrel including: a barrel case in which a lens system is stored; and an image blur correction device including a correction lens configured to correct an optical axis of the lens system and moving the correction lens in a direction perpendicular to the optical axis of the lens system. The image blur correction device in the lens barrel includes a first movable frame, a second movable frame, a fixed base, a driving part and a guide mechanism. The first movable frame holds the correction lens. The second movable frame supports the first movable frame to be movable in a first direction perpendicular to an optical axis of the lens system. The fixed base supports the second movable frame to be movable in a second direction perpendicular to the optical axis of the lens system and perpendicular to the first direction. The driving part moves the first movable frame in the first direction and moves the second movable frame in the second direction. The guide mechanism has at least one guide shaft guiding both the first movable frame and the second movable frame.

According to an embodiment of the present invention, there is provided an imaging apparatus correcting an image blur in a lens system. The imaging apparatus includes a lens barrel including a barrel case, in which the lens system is stored, and an image blur correction device having a correction lens configured to correct an image blur in the lens system; and a device main body to which the lens barrel is attached. The image blur correction device in the imaging apparatus includes a first movable frame, a second movable frame, a fixed base, a driving part and a guide mechanism. The first movable frame holds the correction lens. The second movable frame supports the first movable frame to be movable in a first direction perpendicular to an optical axis of the lens system. The fixed base supports the second movable frame to be movable in a second direction perpendicular to the optical axis of the lens system and perpendicular to the first direction. The driving part moves the first movable frame in the first direction and moves the second movable frame in the second direction. The guide mechanism has at least one guide shaft guiding both the first movable frame and the second movable frame.

According to an image blur correction device, a lens barrel or an imaging apparatus according to an embodiment of the present invention, an image blur correction device may be reduced in size with the number of guide shafts reduced, making it possible to contribute to a reduction in size of the lens barrel or the imaging apparatus including the image blur correction device.

BRIEF DESCRIPTION OF THE DRAWINGS

FIG. 11A is a plan view and FIG. 11B is a bottom view.

FIG. 12A is a plan view and FIG. 12B is a bottom view.

FIG. 13A is a plan view and FIG. 13B is a bottom view.

FIG. 23A is a plan view and FIG. 23B is a bottom view.

FIG. 24A is a plan view and FIG. 24B is a bottom view.

FIG. 25A is a plan view and FIG. 25B is a bottom view.

FIG. 28A is a front view and FIG. 28B is a left side view.

FIG. 36 is a block diagram showing a second example of a schematic configuration of an imaging apparatus according to an embodiment of the present invention.

DESCRIPTION OF THE PREFERRED EMBODIMENTS

An image blur correction device and a lens barrel and an imaging apparatus including the image blur correction device are realized with a simplified structure, where the image blur correction device includes a guide mechanism having at least one guide shaft guiding both a first movable frame and a second movable frame, making it possible to reduce the number of guide shafts and reduce the whole device in size.

Figure 1:
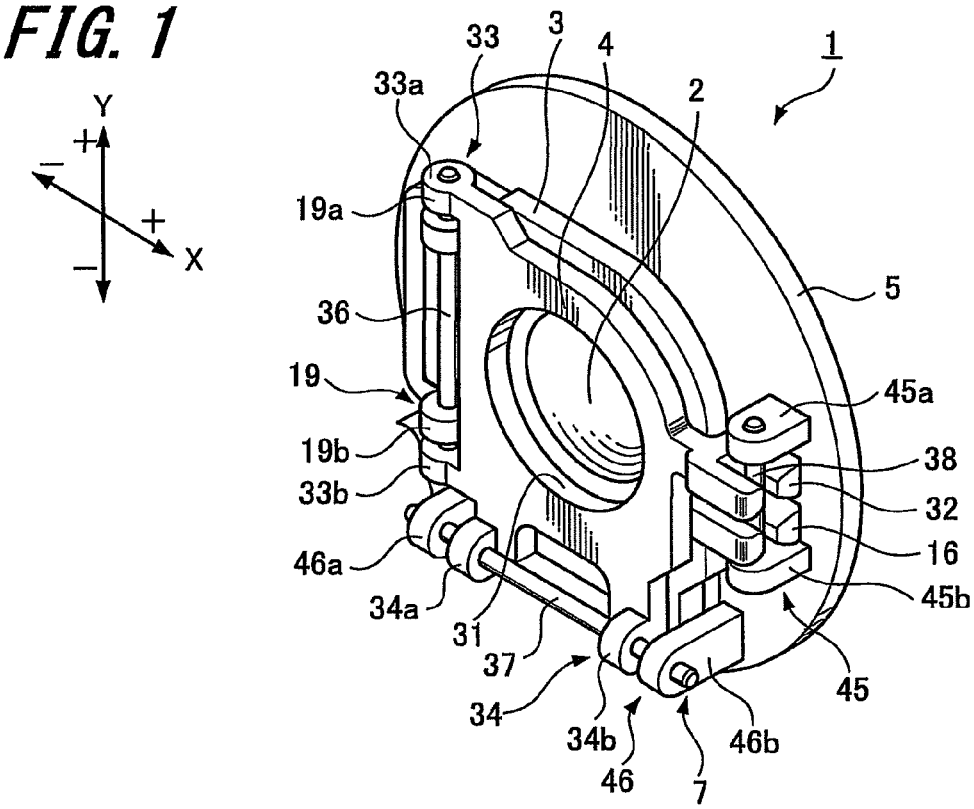
FIG. 1 is a perspective view showing a first example of an image blur correction device according to an embodiment of the present invention.
Figure 2:
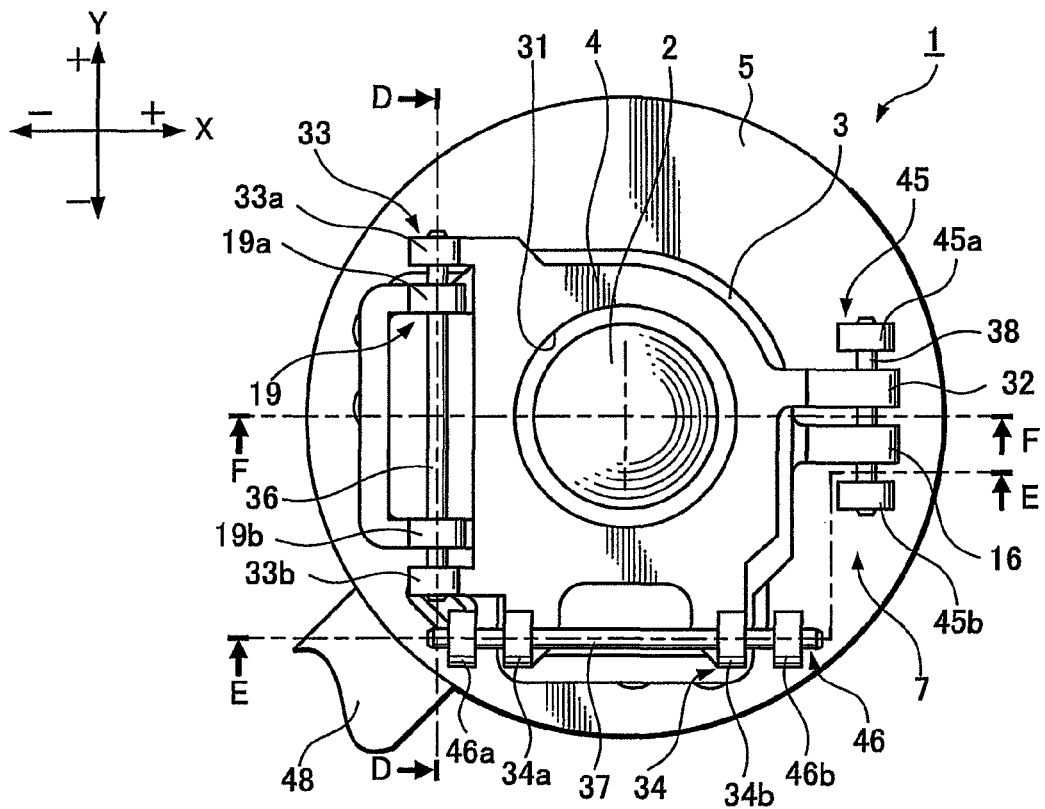
FIG. 2 is a plan view showing a first example of an image blur correction device according to an embodiment of the present invention.
Figure 3:
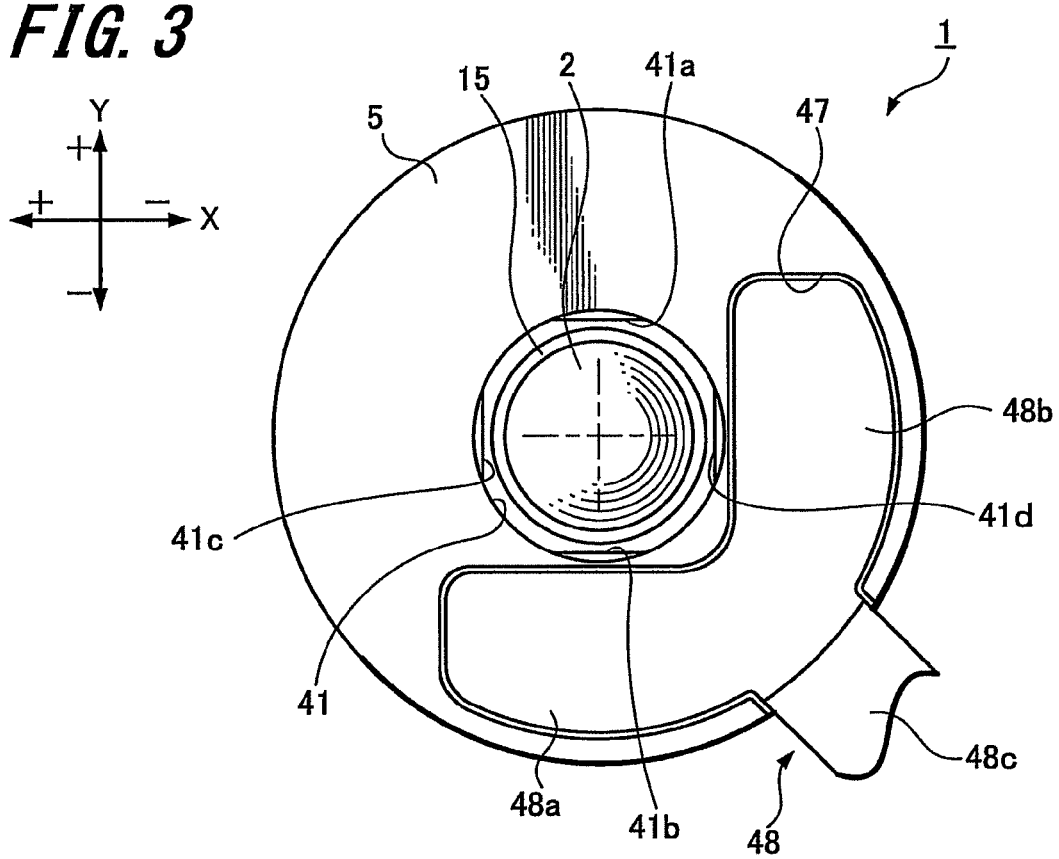
FIG. 3 is a bottom view showing a first example of an image blur correction device according to an embodiment of the present invention.
Figure 4A:
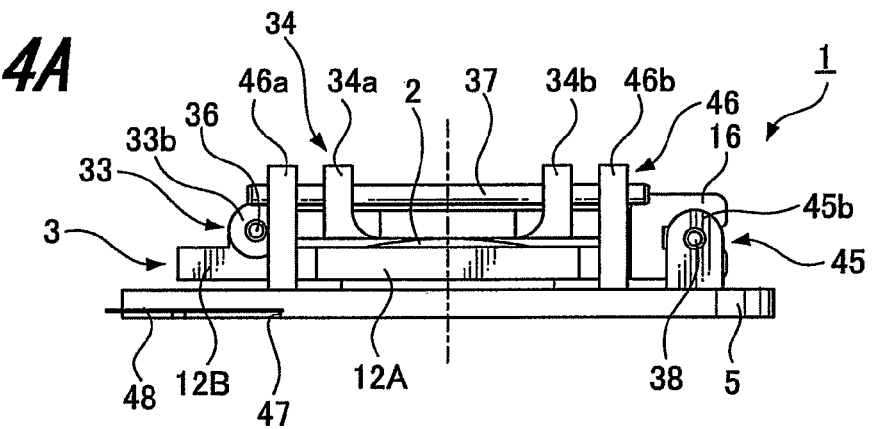
FIG. 4A is a front view and FIG. 4B is a left side view, showing a first example of an image blur correction device according to an embodiment of the present invention.
Figure 4B:
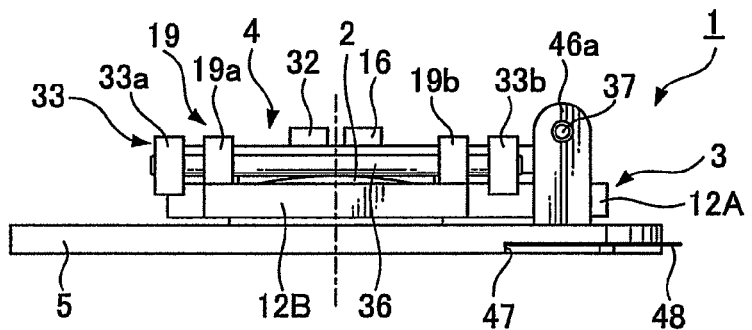
Figure 5A:
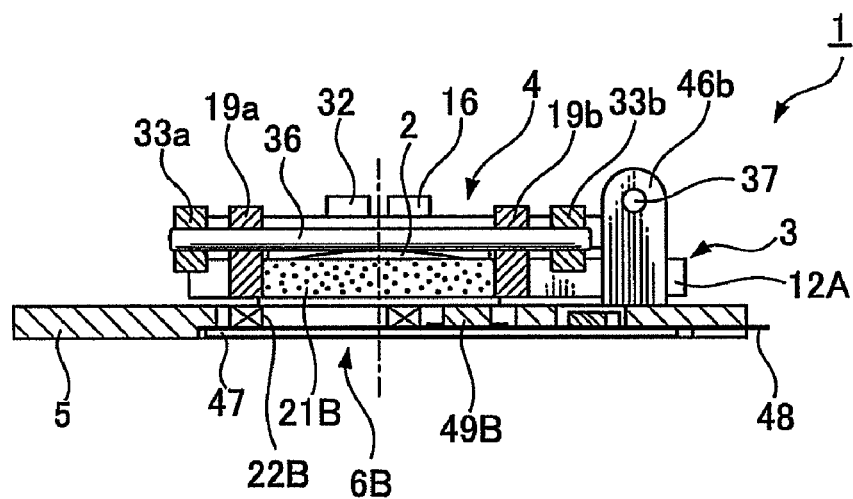
FIG. 5A is a cross-sectional view of a part along a D-D line of the image blur correction device shown in FIG. 2.
Figure 5B:
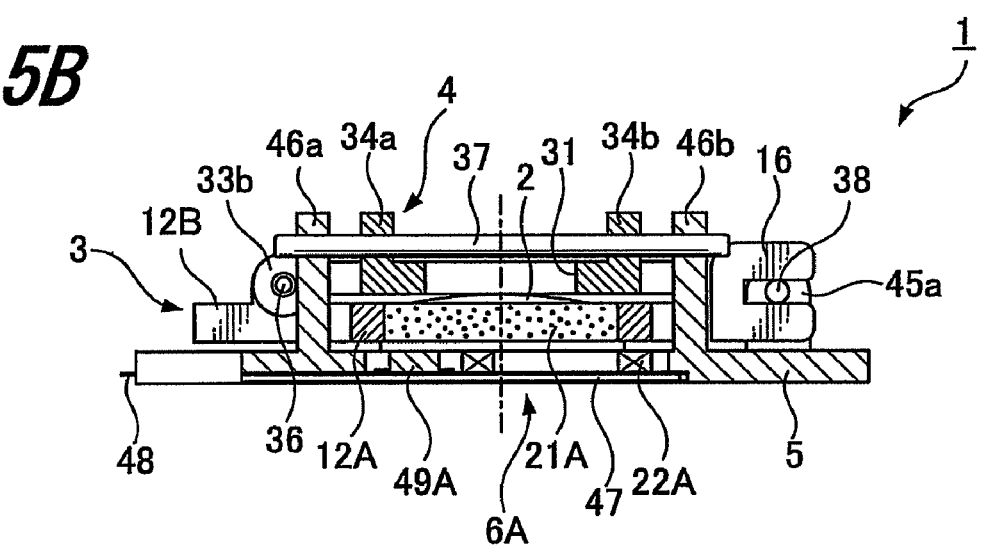
FIG. 5B is a cross-sectional view of a part along an E-E line of the same.
Figure 5C:
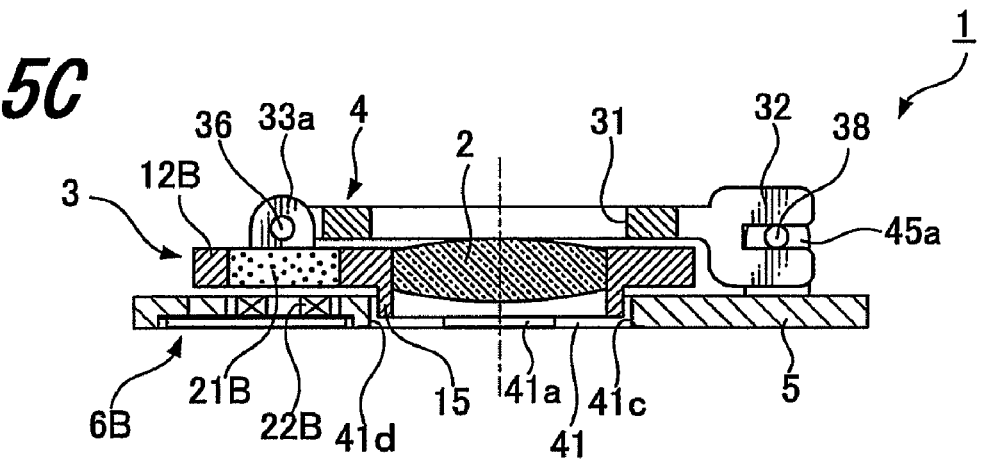
FIG. 5C is a cross-sectional view of a part along an F-F line of the same.
Figure 6:
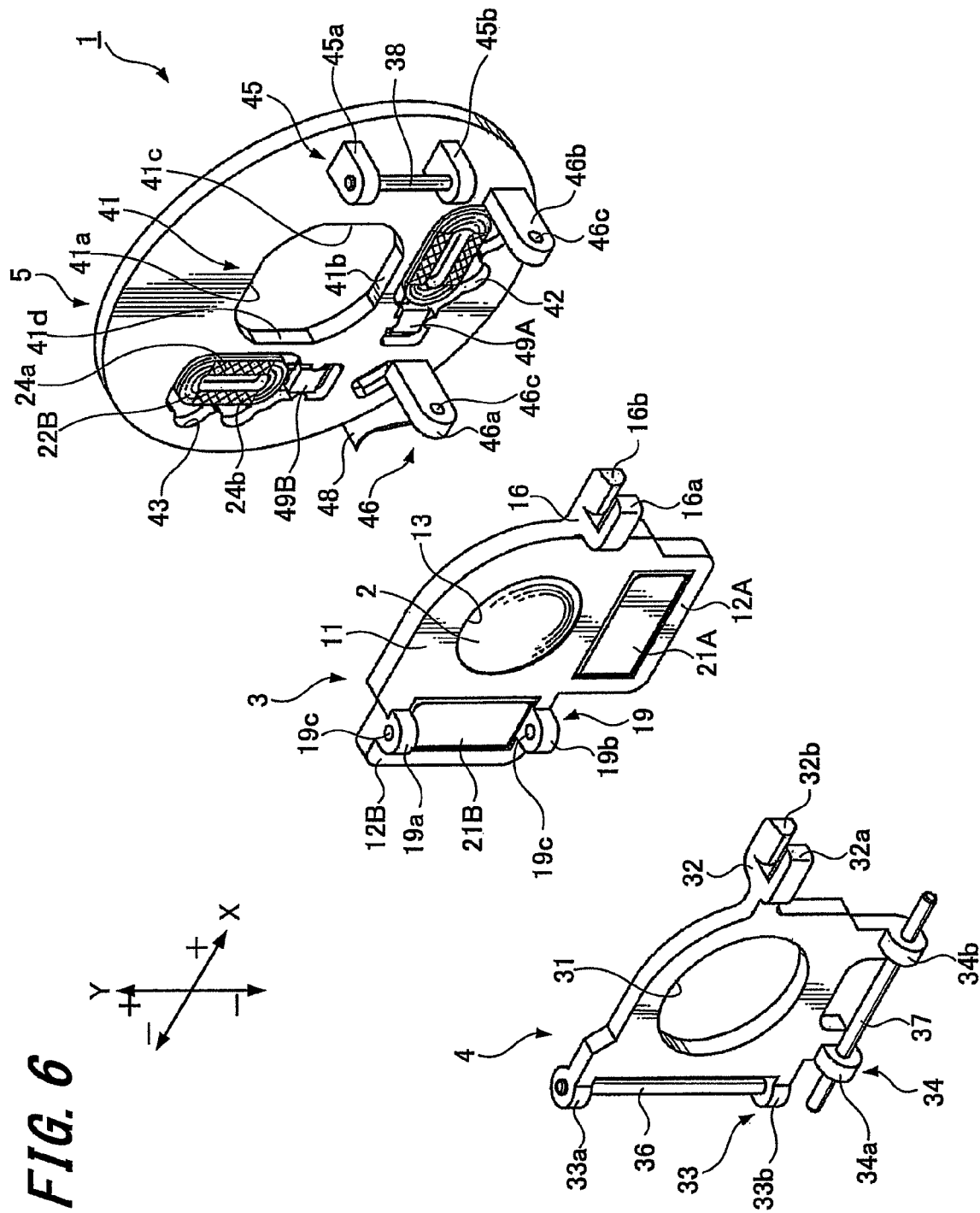
FIG. 6 is an exploded perspective view showing a first example of an image blur correction device according to an embodiment of the present invention.
Figure 7:
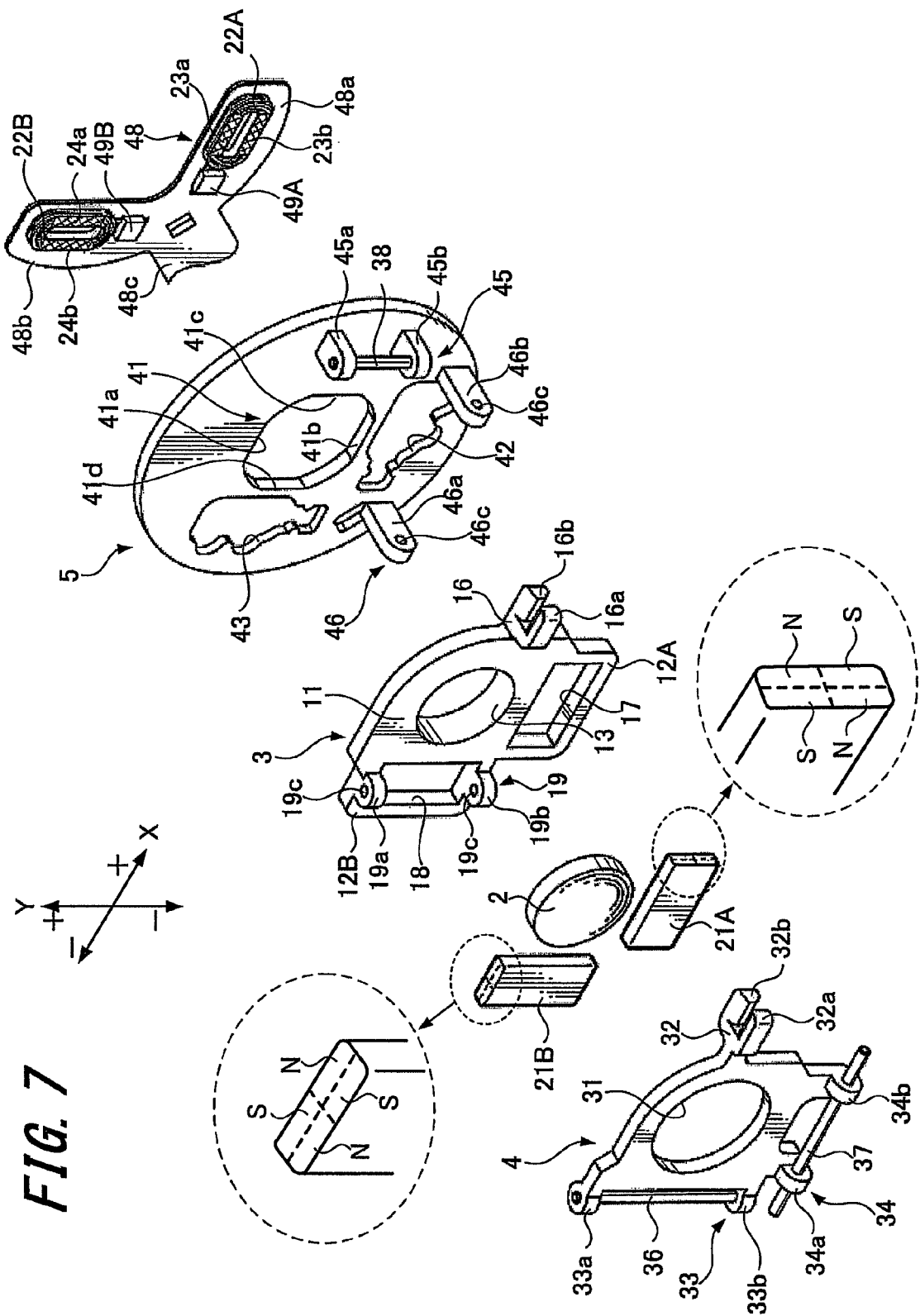
FIG. 7 is an exploded perspective view showing component units of a first example of an image blur correction device according to an embodiment of the present invention.
Figure 8:
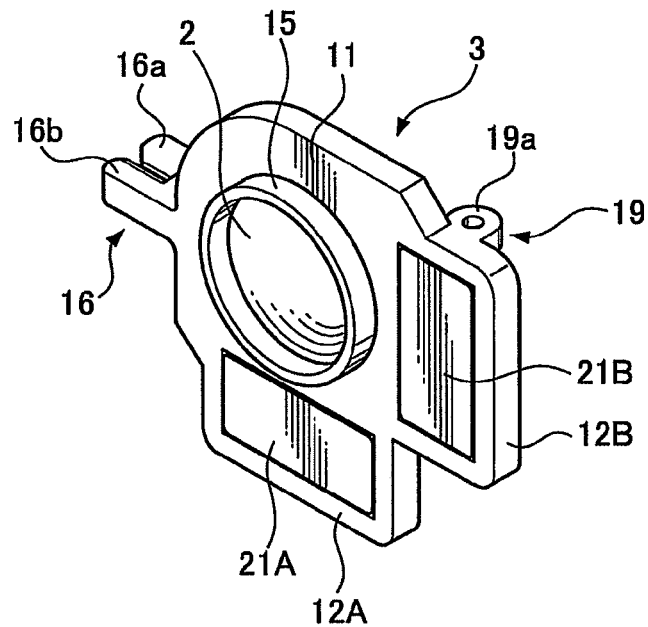
FIG. 8 is a perspective view of a first movable frame shown in FIG. 7 on the side of a fixed base.
Figure 9:
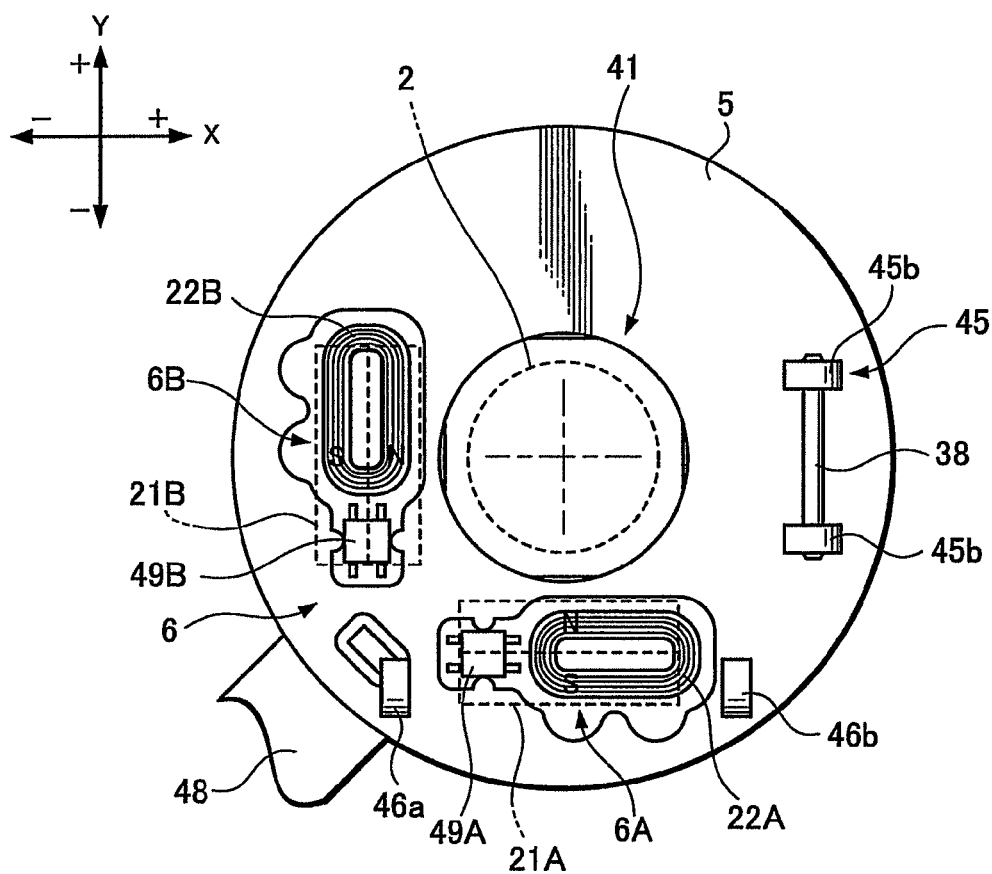
FIG. 9 is a view describing a driving part of a first example of an image blur correction device according to an embodiment of the present invention.
Figure 10:
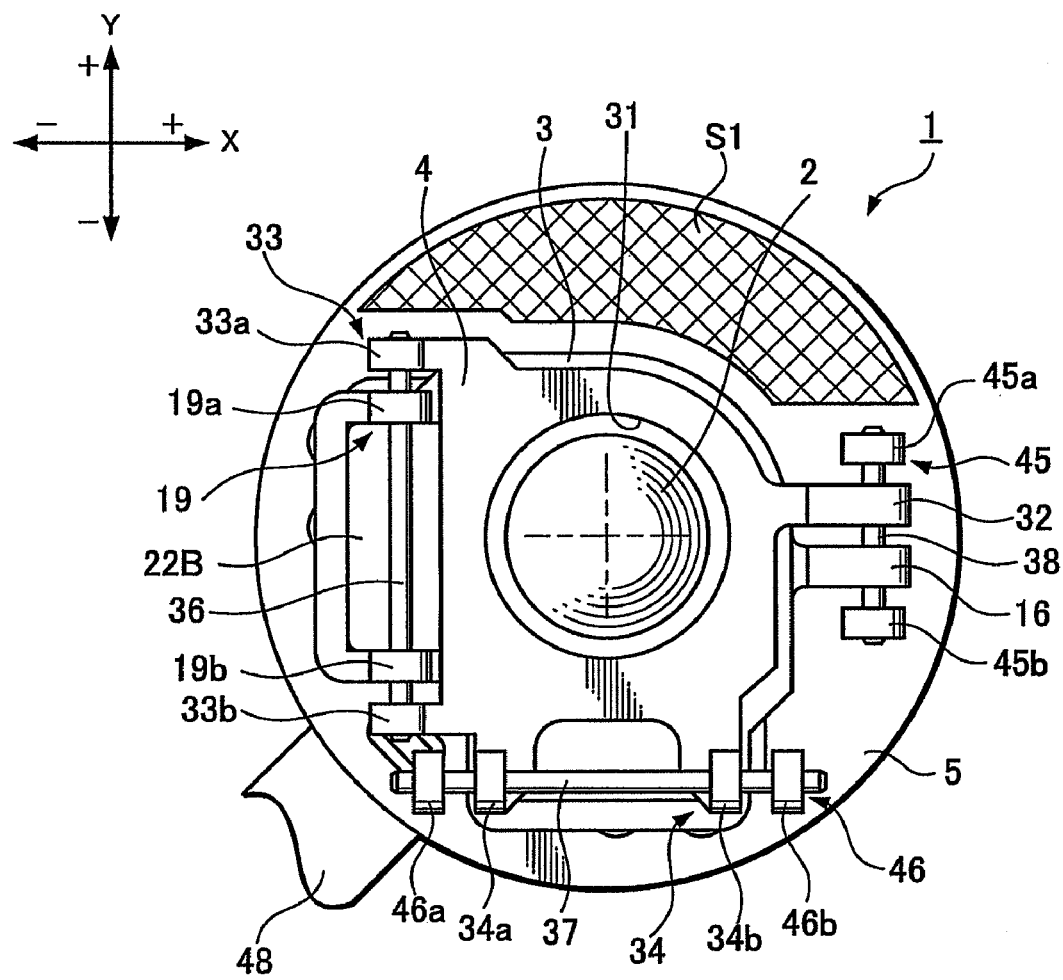
FIG. 10 is a view describing a space resulting from applying a guide mechanism of a first example of an image blur correction device according to an embodiment of the present invention.
Figure 11A:
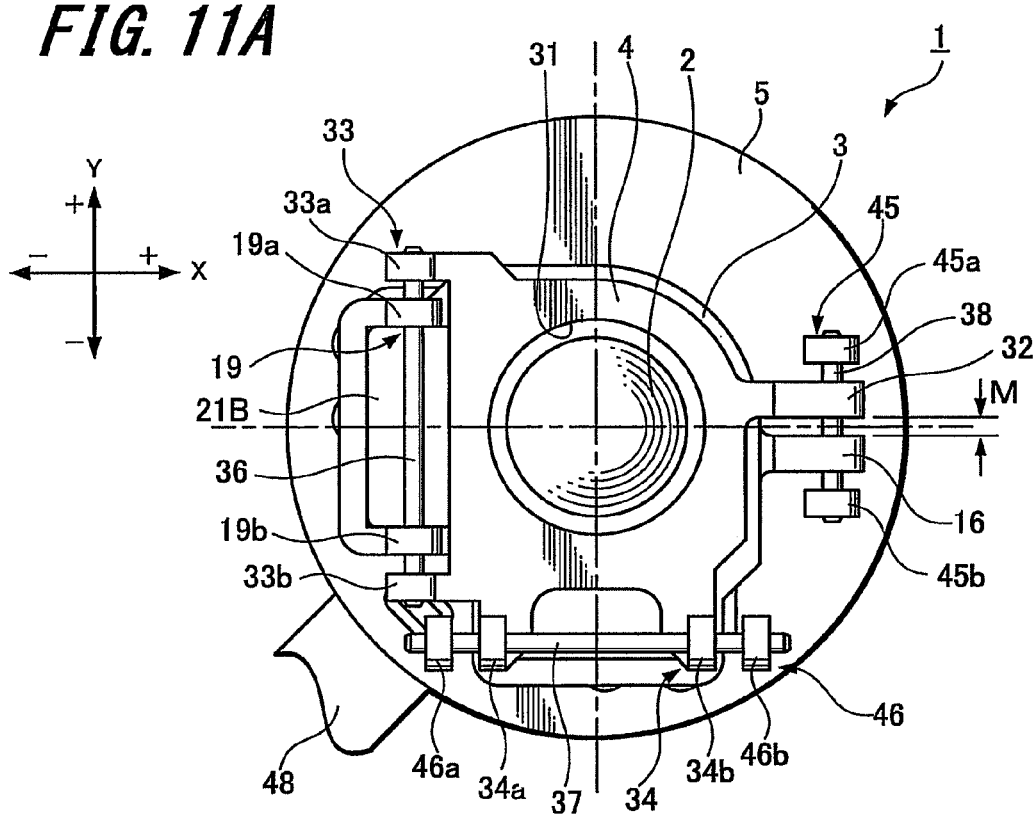
FIGS. 11A and 11B show a state in which a first movable frame of a first example of an image blur correction device according to an embodiment of the present invention is placed in a reference position, where
Figure 11B:
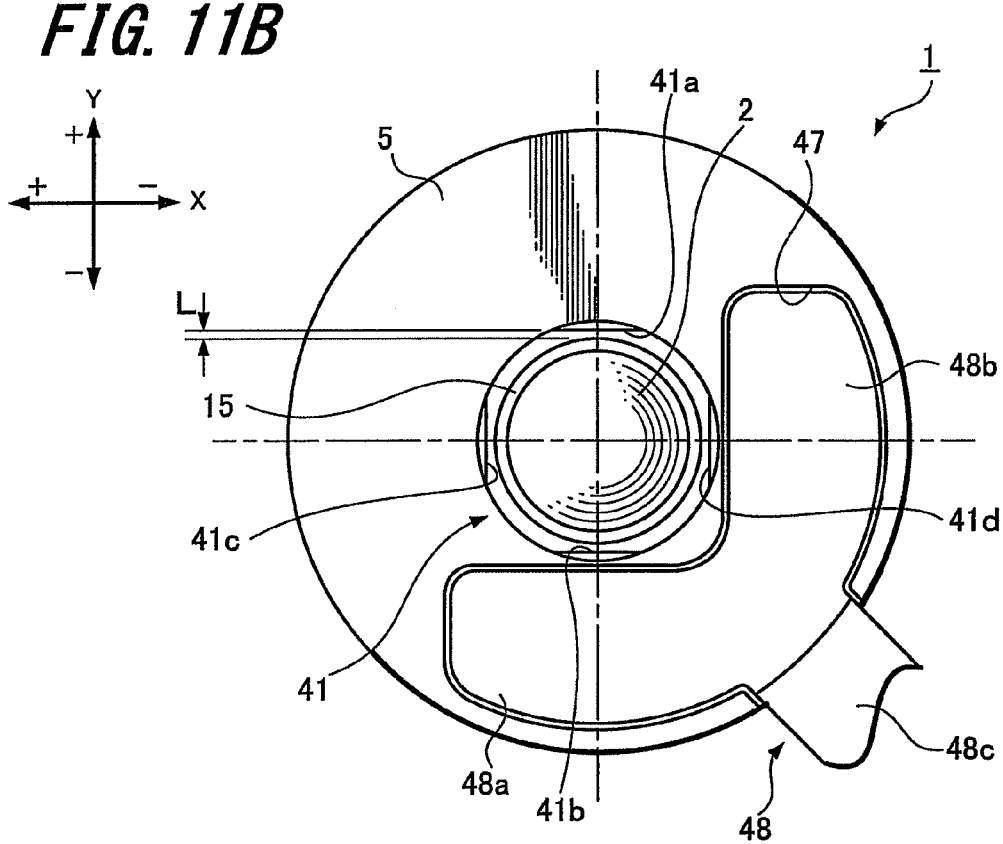
Figure 12A:
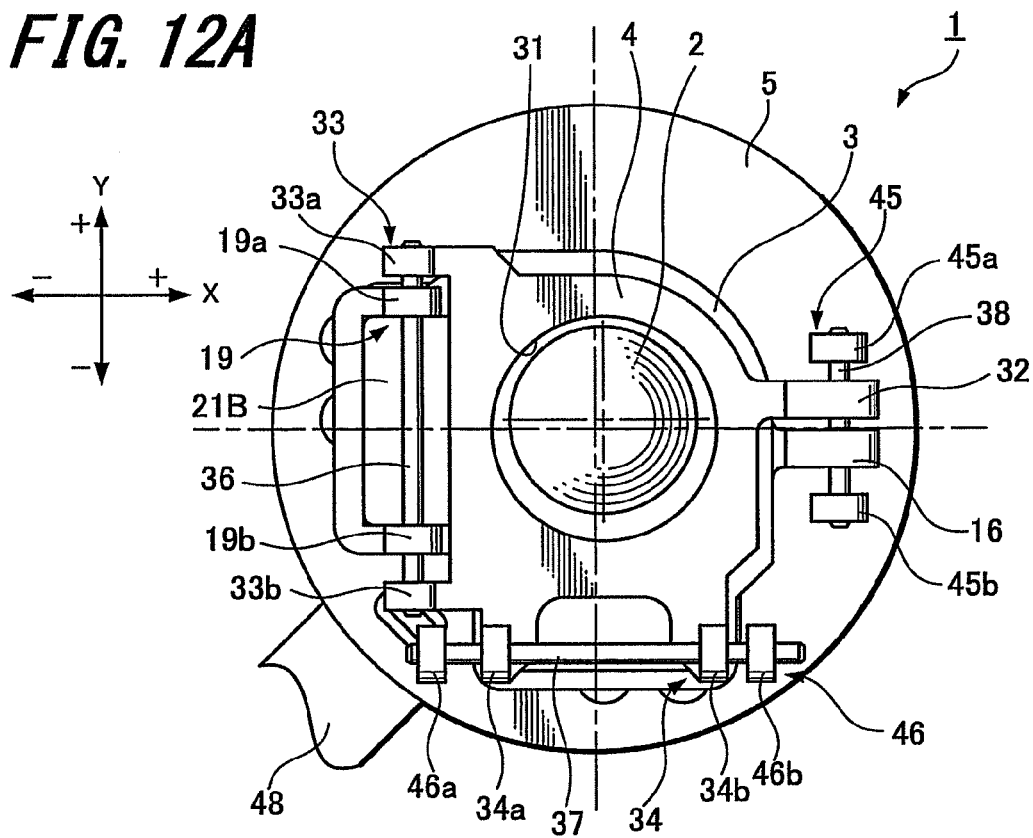
FIGS. 12A and 12B show a state in which a first movable frame of a first example of an image blur correction device according to an embodiment of the present invention is moved to a (+) side in a first direction and a (+) side in a second direction, where
Figure 12B:
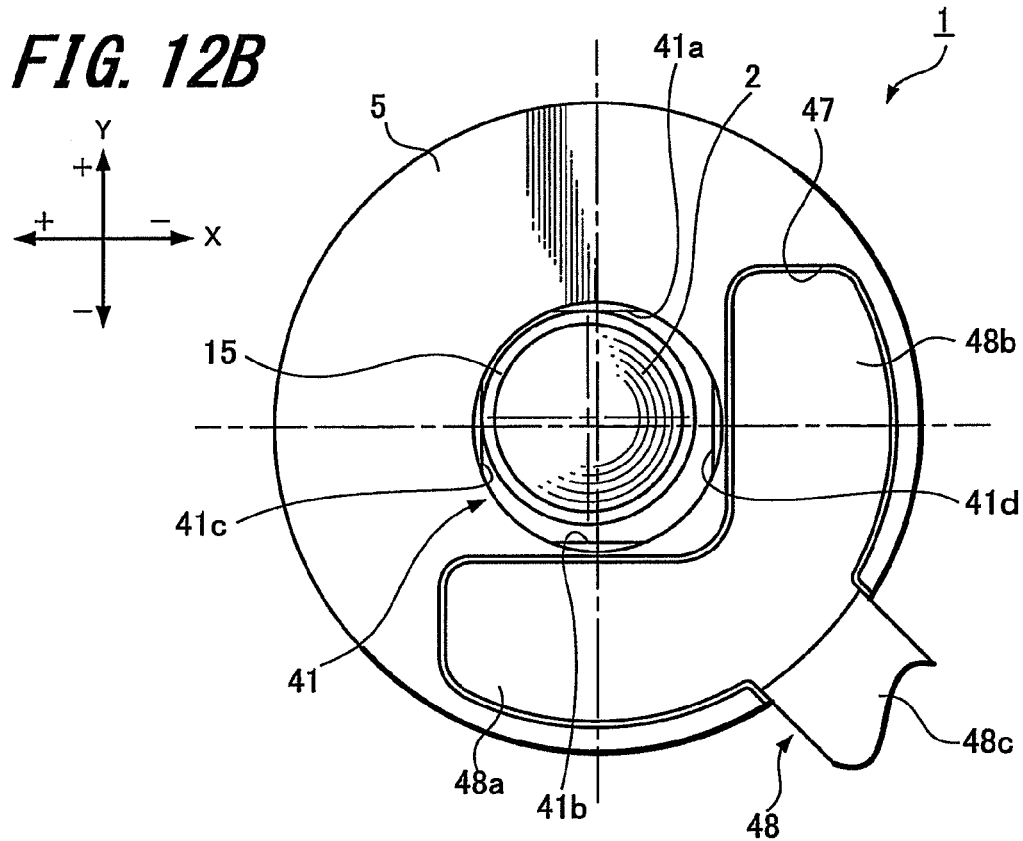
Figure 13A:
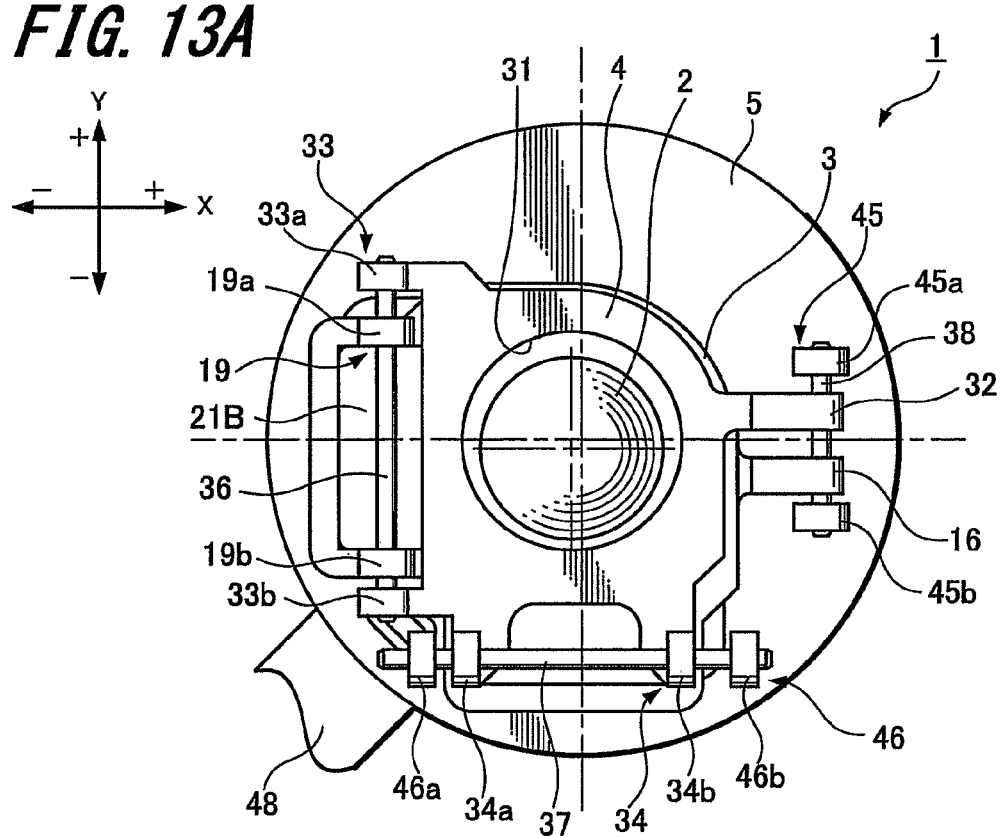
FIGS. 13A and 13B show a state in which a first movable frame of a first example of an image blur correction device according to an embodiment of the present invention is moved to a (−) side in the first direction and a (−) side in the second direction, where
Figure 13B:
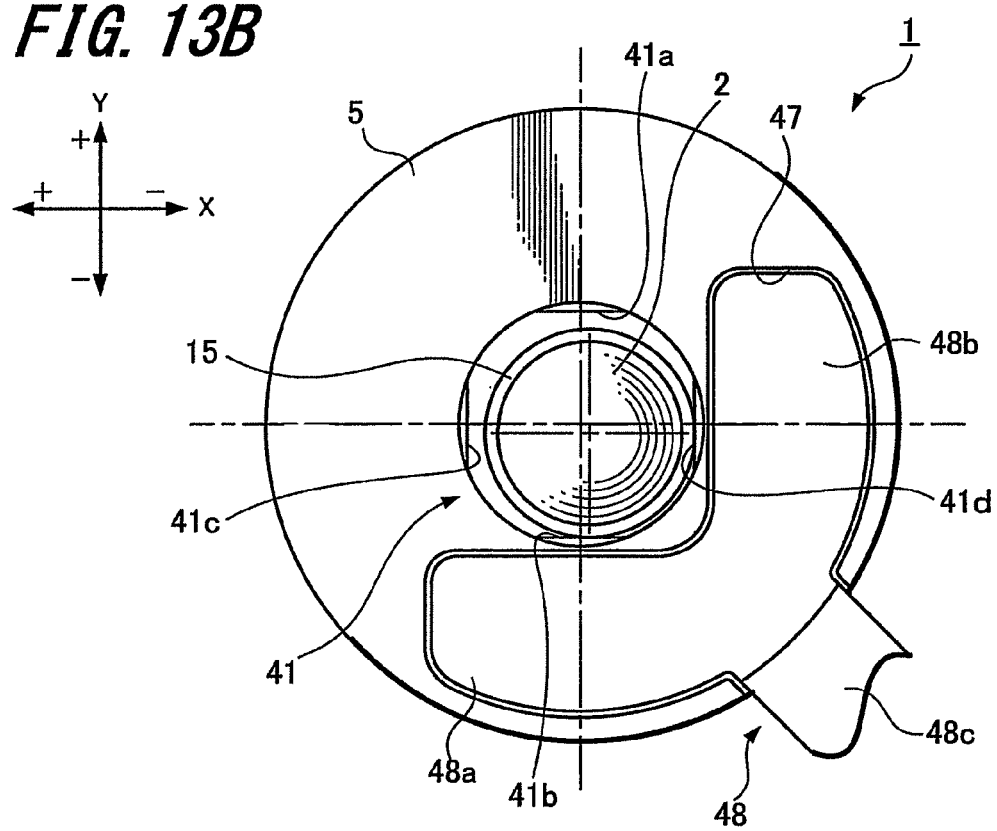
Figure 14:
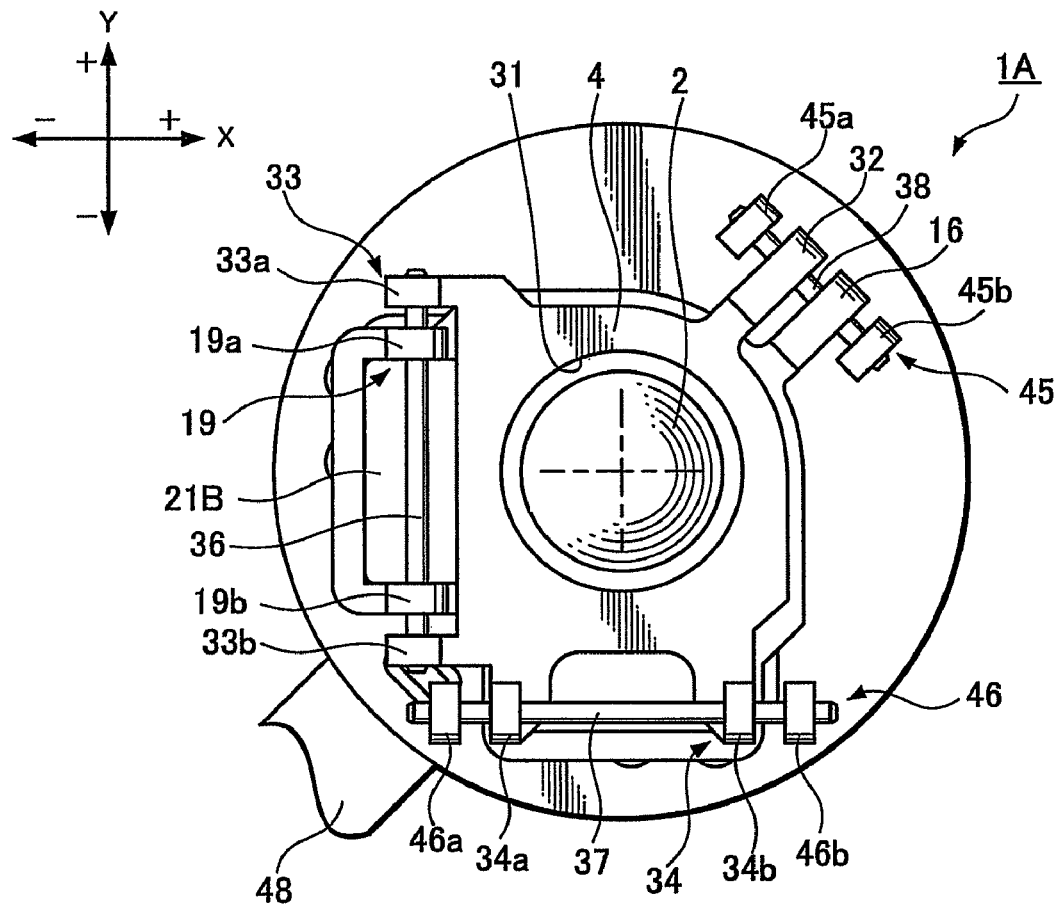
FIG. 14 is a plan view showing a second example of an image blur correction device according to an embodiment of the present invention.
Figure 15:
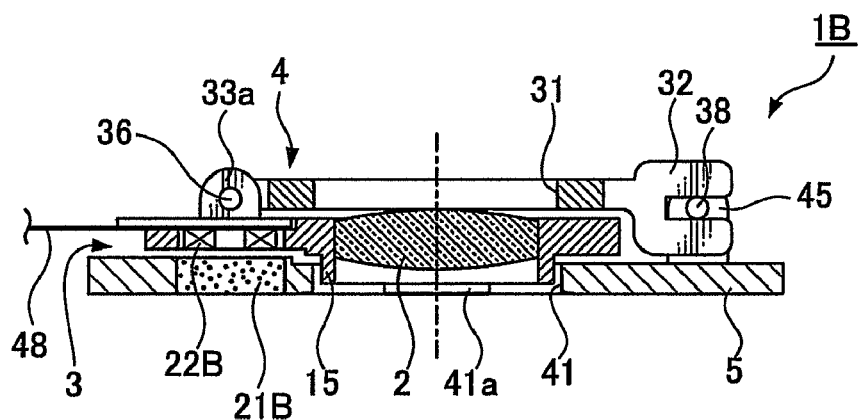
FIG. 15 is a cross-sectional view showing a third example of an image blur correction device according to an embodiment of the present invention.

Embodiments of the present invention will be described below with reference to the attached drawings. FIGS. 1 to 36 describe examples of embodiments of the present invention. Specifically, FIG. 1 is a perspective view showing a first example of an image blur correction device according to an embodiment of the present invention. FIG. 2 is a plan view of the same. FIG. 3 is a bottom view of the same. FIG. 4A is a front view of the same and FIG. 4B is a left side view of the same. FIG. 5A is a cross-sectional view of a part along a D-D line of the image blur correction device shown in FIG. 2, FIG. 5B is a cross-sectional view of a part along an E-E line of the same, and FIG. 5C is a cross-sectional view of a part along an F-F line of the same. FIG. 6 is an exploded perspective view of the first example. FIG. 7 is a perspective view showing components of the first example. FIG. 8 is a perspective view of a first movable frame shown in FIG. 7, showing the side facing a fixed base. FIG. 9 is a view describing a driving part. FIG. 10 is a view describing a space resulting from applying a guide mechanism of the first example. FIGS. 11A and 11B are views describing a state where a first movable frame is placed in a reference position. FIGS. 12A and 12B are views describing a state where a first movable frame is moved to a (+) side in a first direction and a (+) side in a second direction. FIGS. 13A and 13B are views describing a state where a first movable frame is moved to a (−) side in the first direction and a (−) side in the second direction. FIG. 14 is a plan view showing a second example of an image blur correction device according to an embodiment of the present invention. FIG. 15 is a cross-sectional view showing a third example of an image blur correction device according to an embodiment of the present invention.

Figure 16:
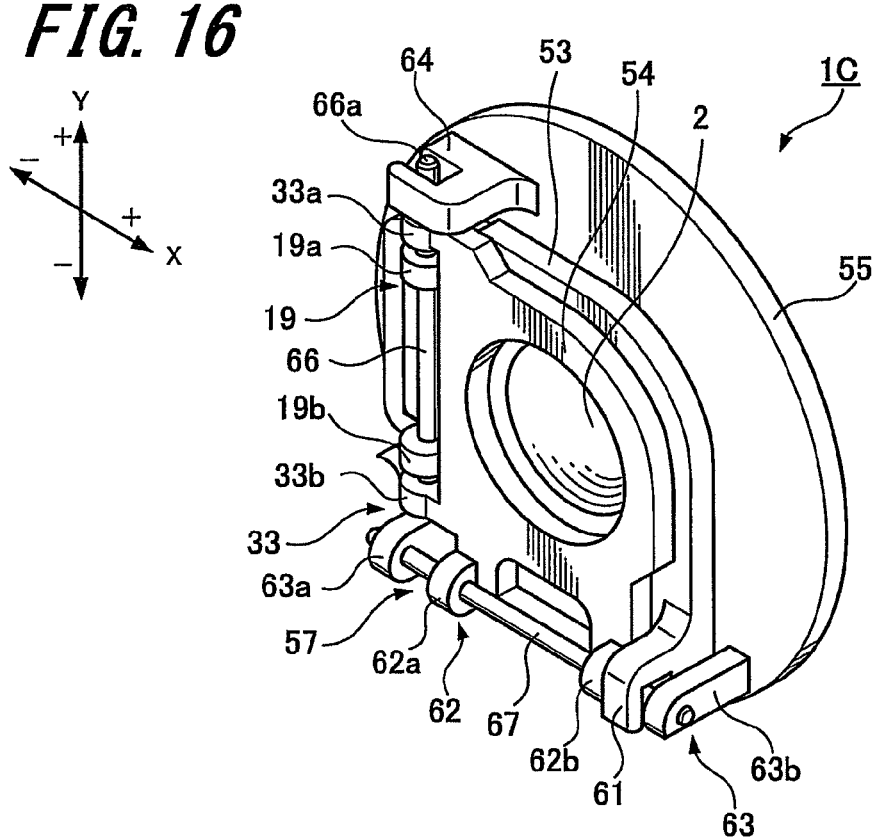
FIG. 16 is a perspective view showing a fourth example of an image blur correction device according to an embodiment of the present invention.
Figure 17:
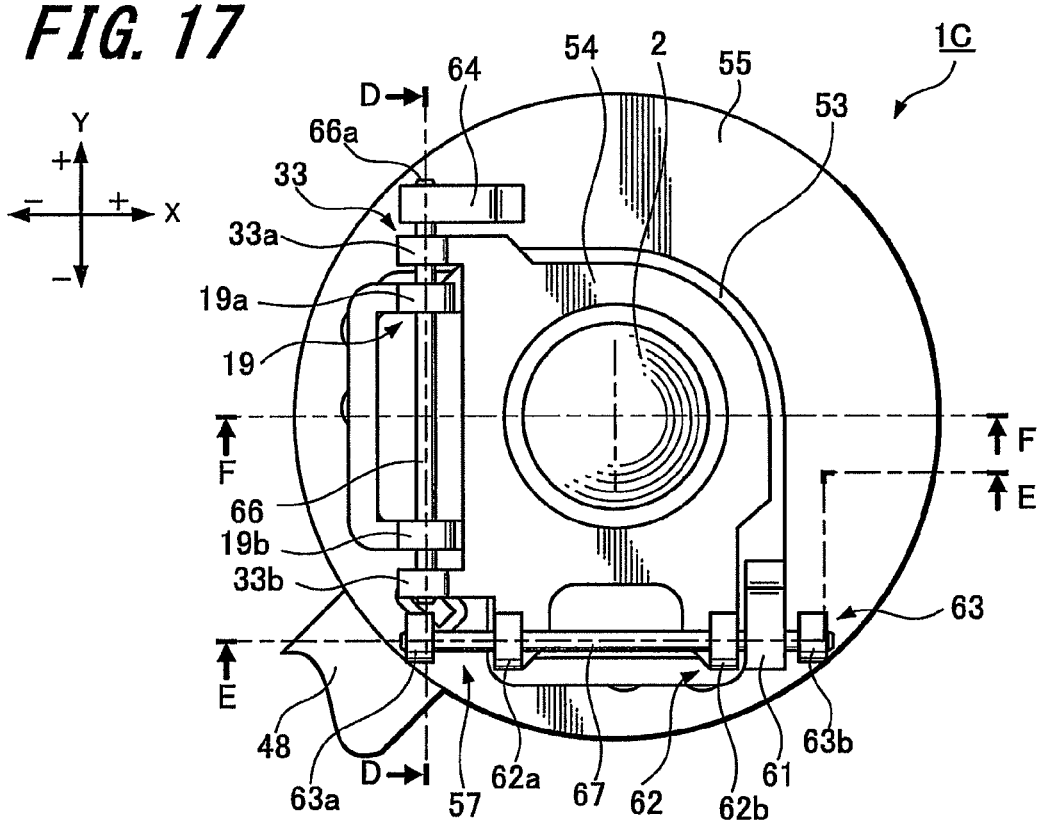
FIG. 17 is a plan view showing a fourth example of an image blur correction device according to an embodiment of the present invention.
Figure 18A:
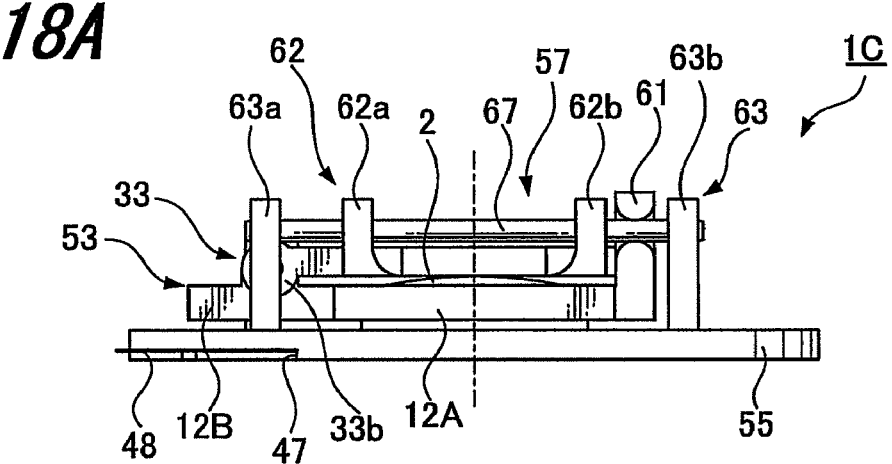
FIG. 18A is a front view and FIG. 18B is a left side view, showing a fourth example of an image blur correction device according to an embodiment of the present invention.
Figure 18B:
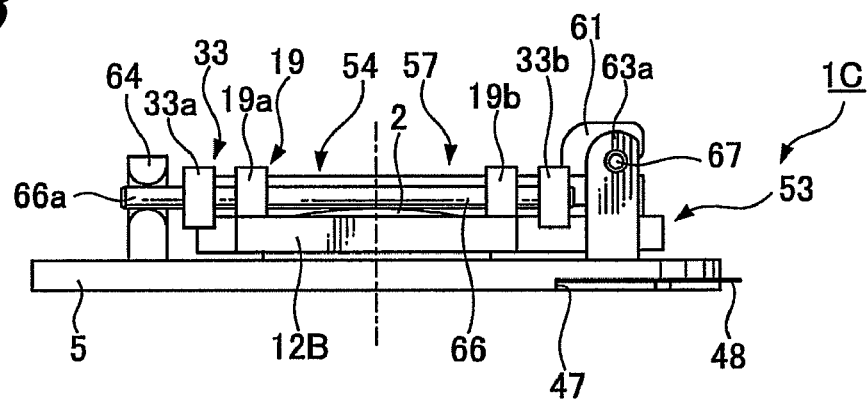
Figure 19A:
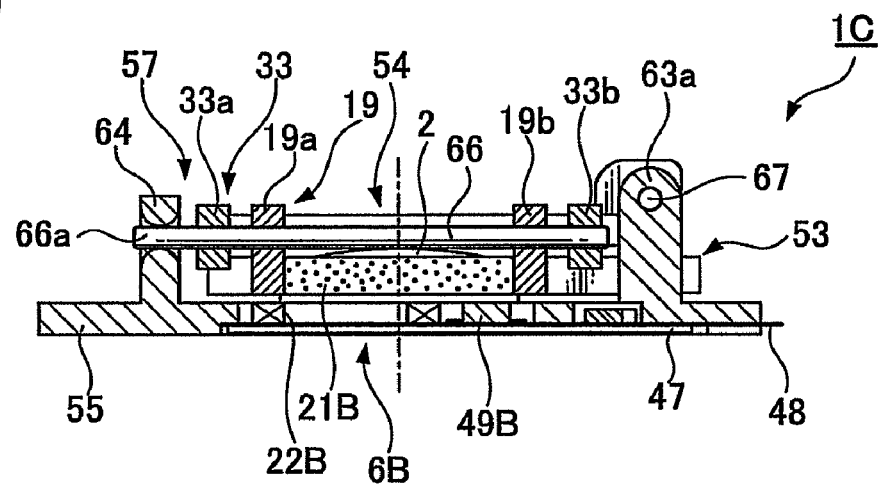
FIG. 19A is a cross-sectional view of a part along a D-D line of the image blur correction device shown in FIG. 17.
Figure 19B:
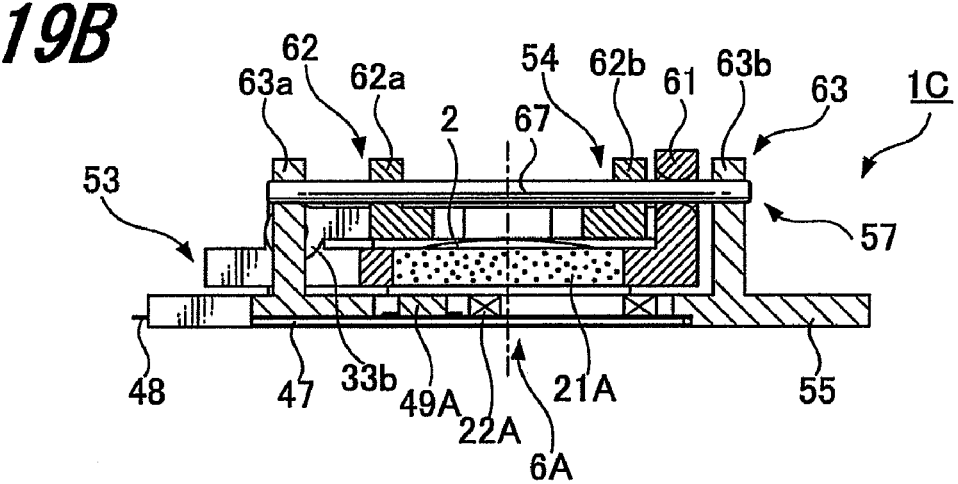
FIG. 19B is a cross-sectional view of a part along an E-E line of the same.
Figure 19C:
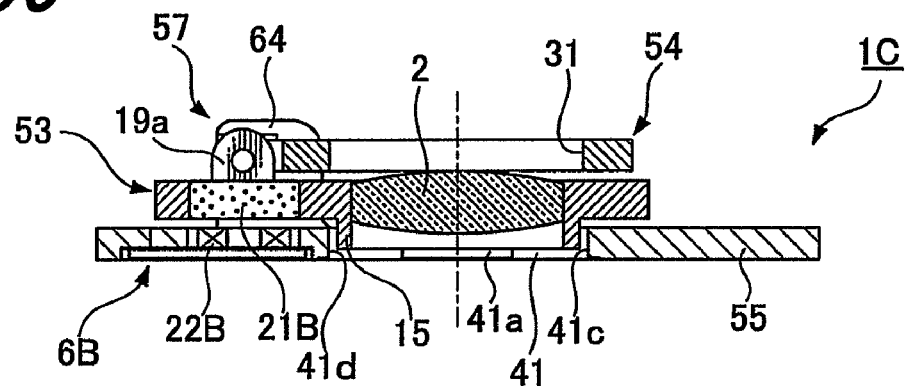
FIG. 19C is a cross-sectional view of a part along an F-F line of the same.
Figure 20:
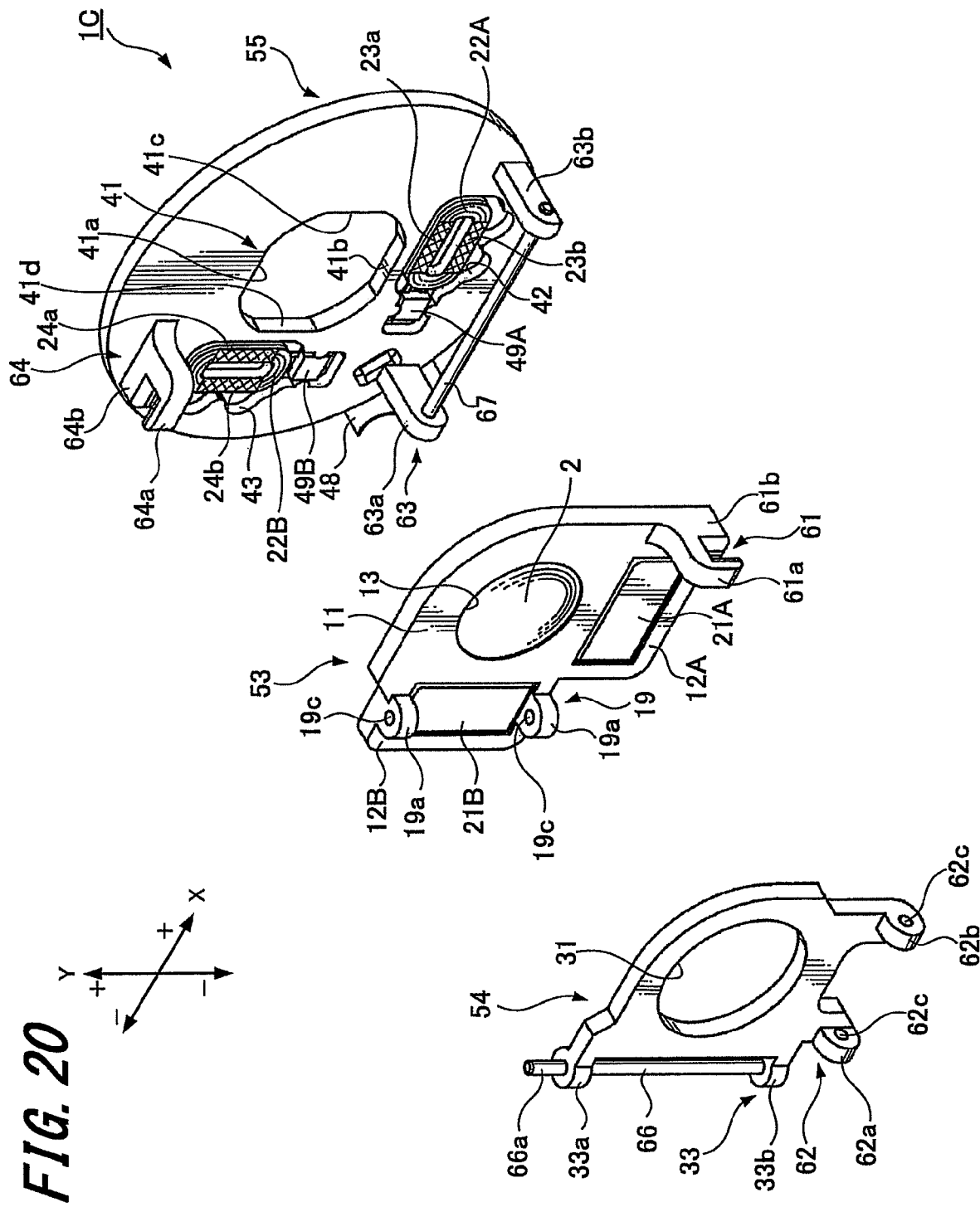
FIG. 20 is an exploded perspective view showing a fourth example of an image blur correction device according to an embodiment of the present invention.
Figure 21:
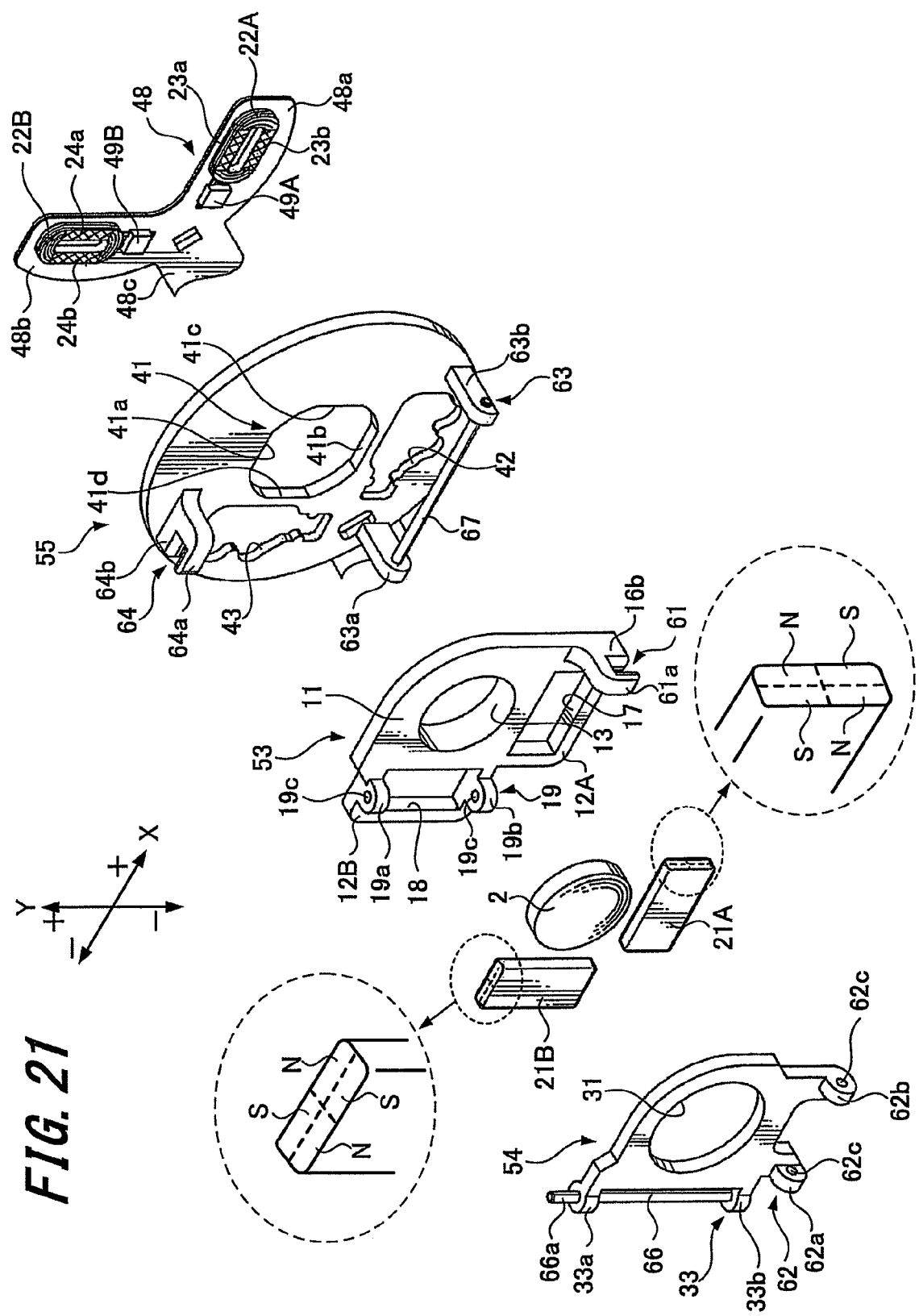
FIG. 21 is an exploded perspective view showing component units of a fourth example of an image blur correction device according to an embodiment of the present invention.
Figure 22:
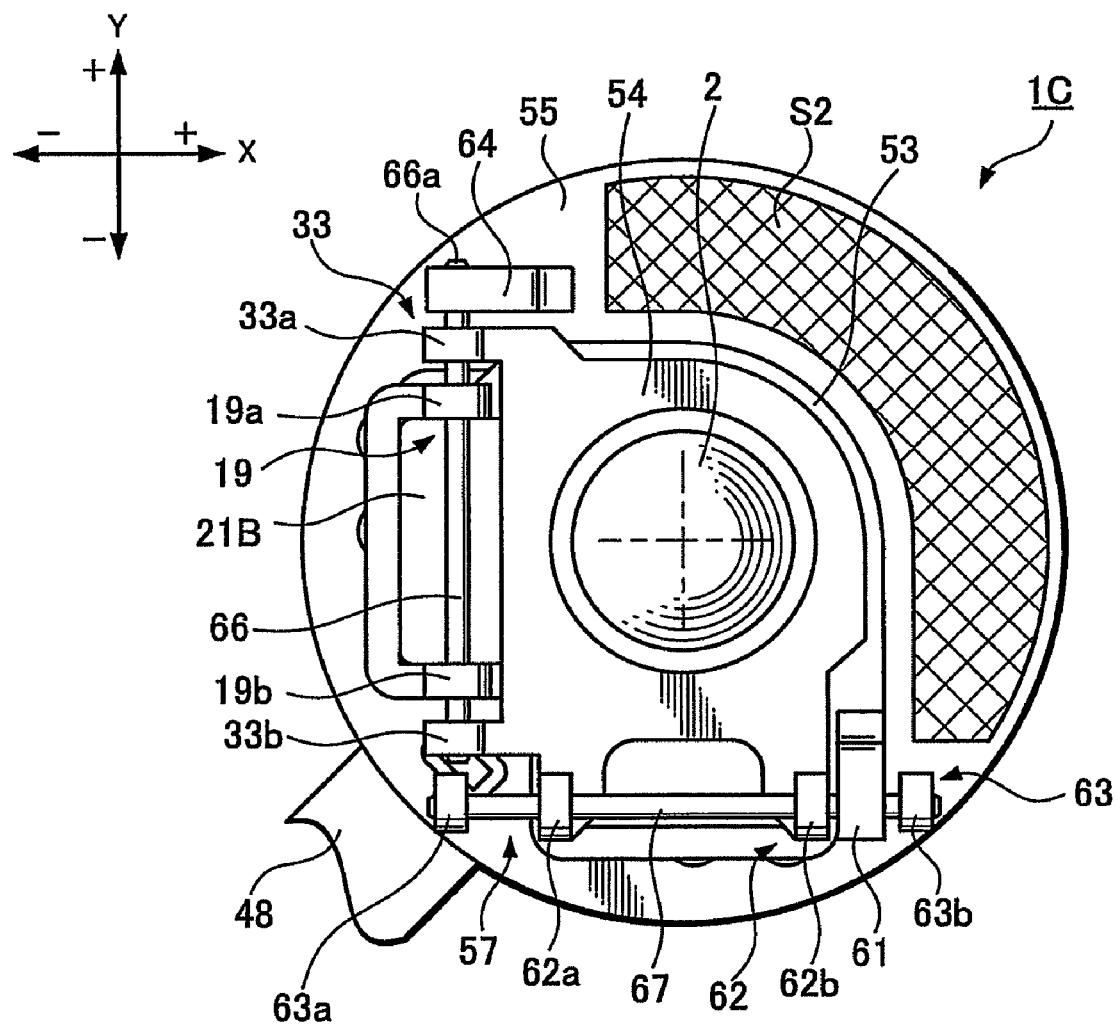
FIG. 22 is a view describing a space resulting from applying a guide mechanism of a fourth example of an image blur correction device according to an embodiment of the present invention.
Figure 23A:
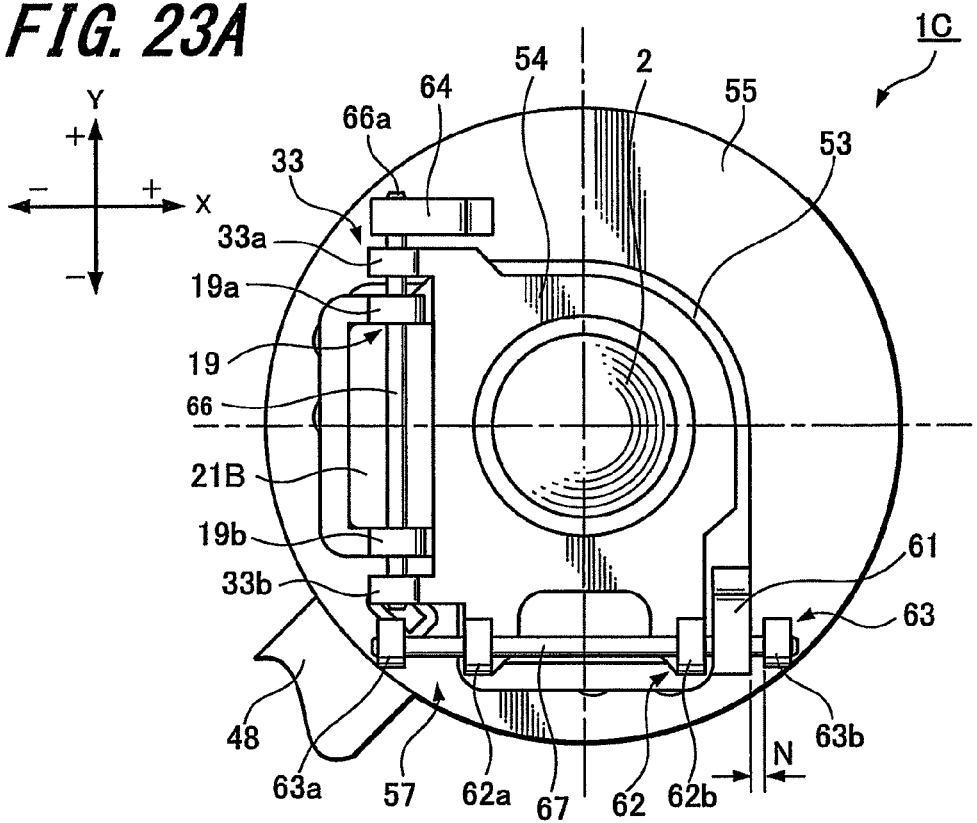
FIG. 23A and 23B show a state in which a first movable frame of a fourth example of an image blur correction device according to an embodiment of the present invention is placed in a reference position, where
Figure 23B:
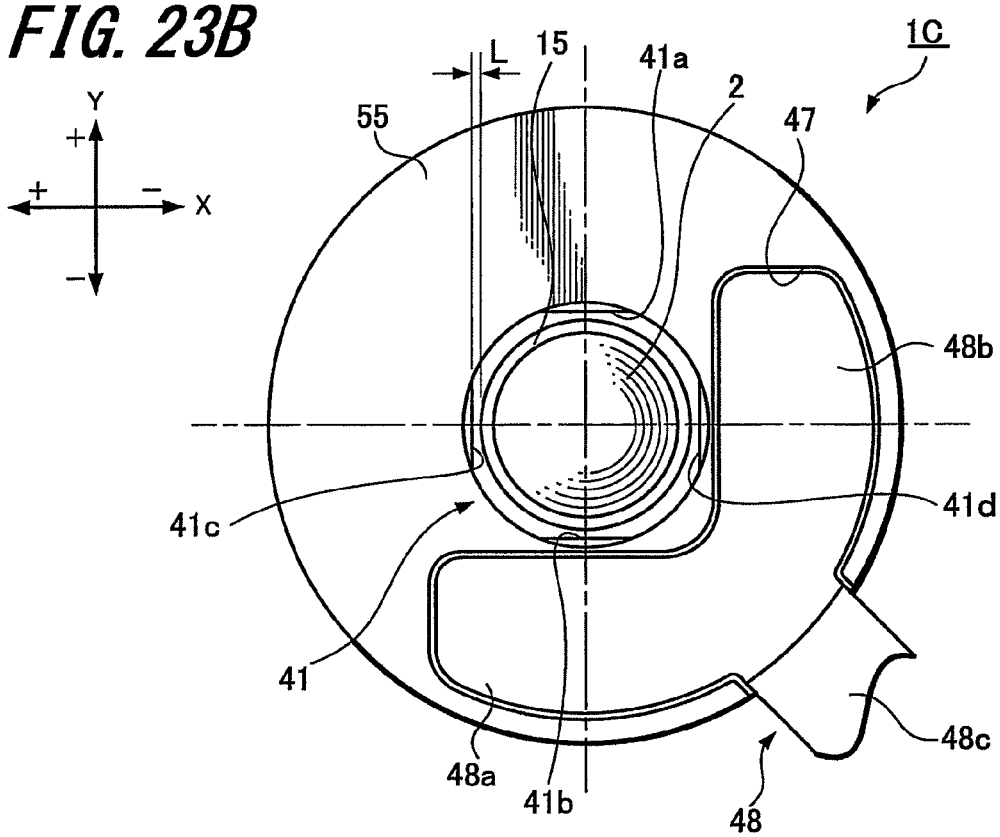
Figure 24A:
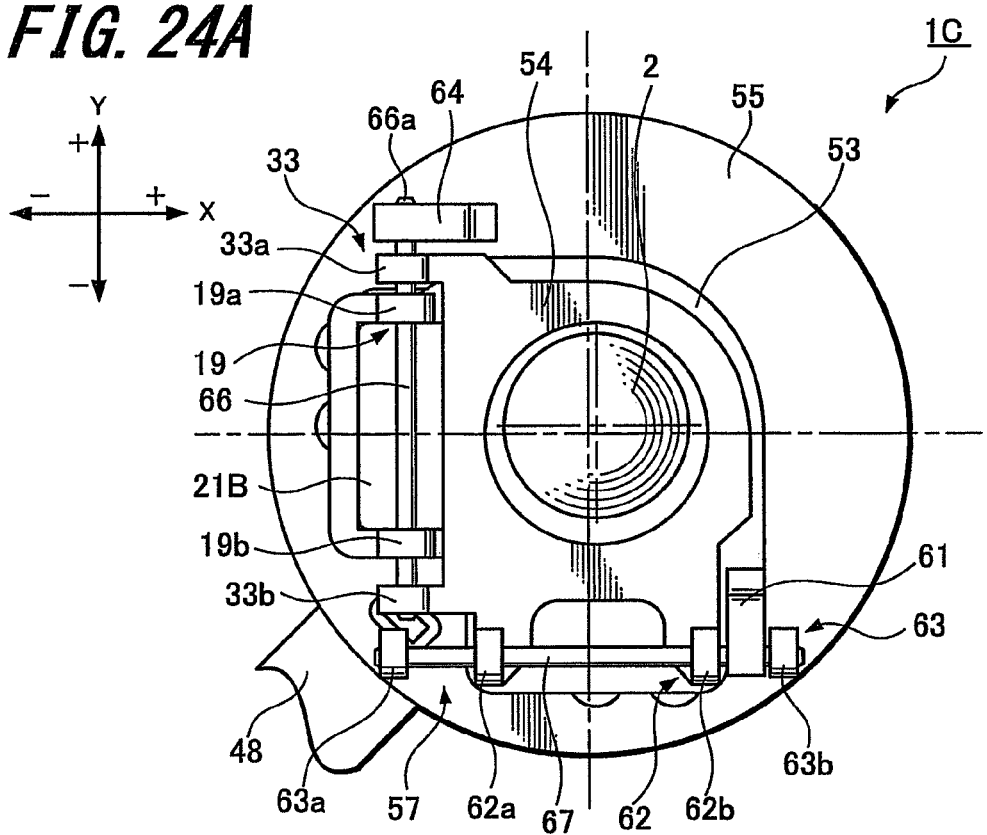
FIGS. 24A and 24B show a state in which a first movable frame of a fourth example of an image blur correction device according to an embodiment of the present invention is moved to the (+) side in the first direction and the (+) side in the second direction, where
Figure 24B:
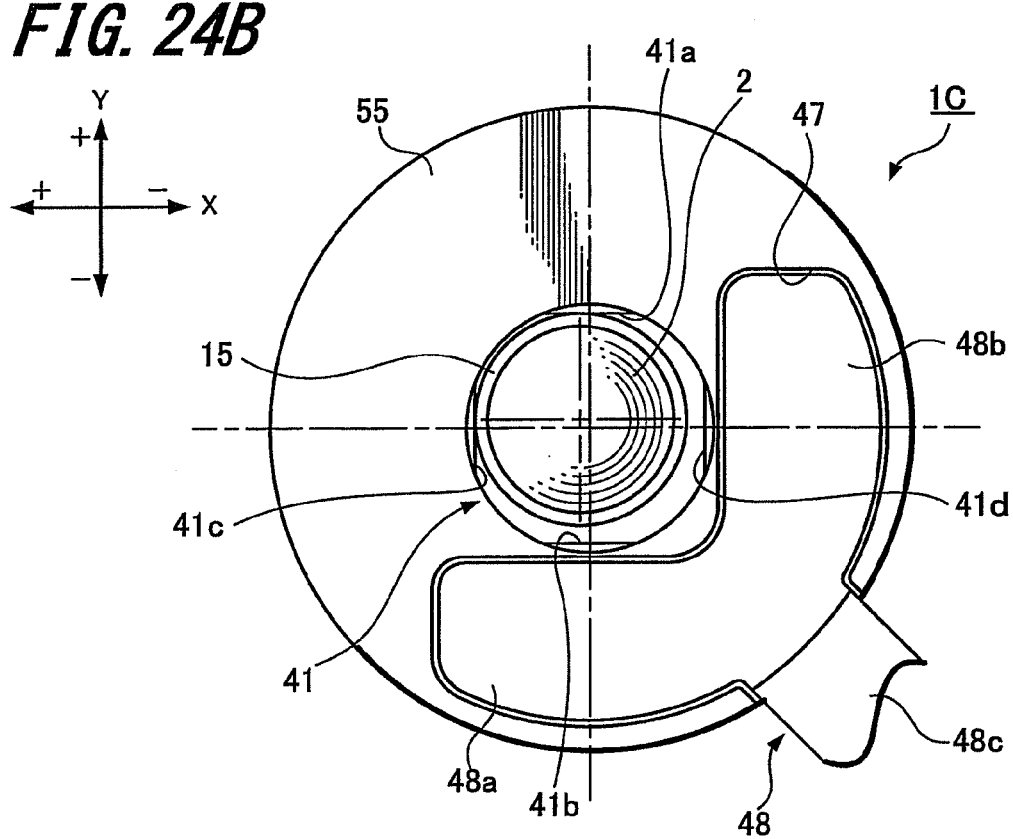
Figure 25A:
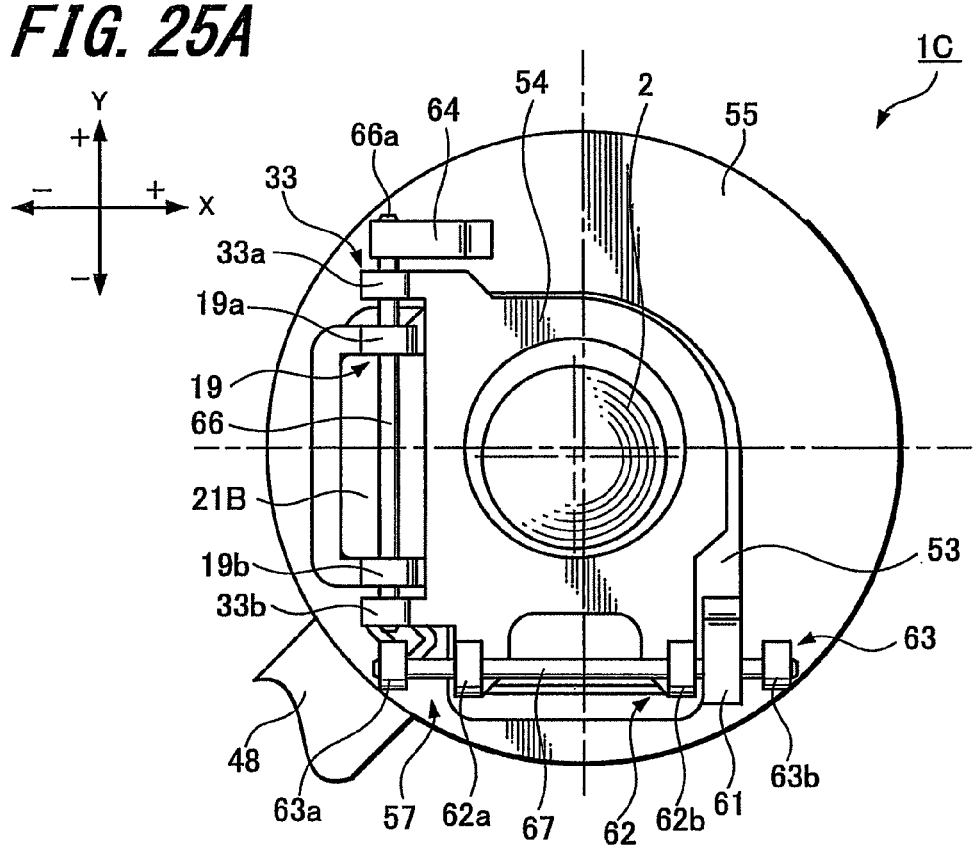
FIGS. 25A and 25B show a state in which a first movable frame of a fourth example of an image blur correction device according to an embodiment of the present invention is moved to the (−) side in the first direction and (−) side in the second direction, where
Figure 25B:
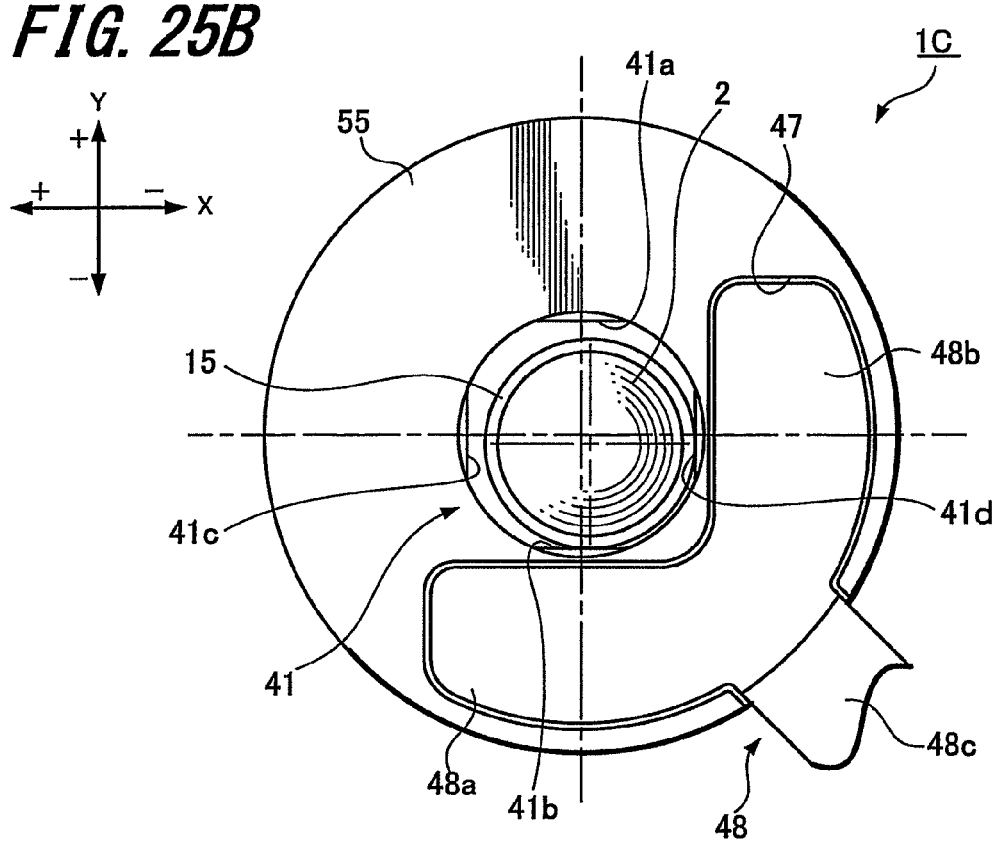
Figure 26:
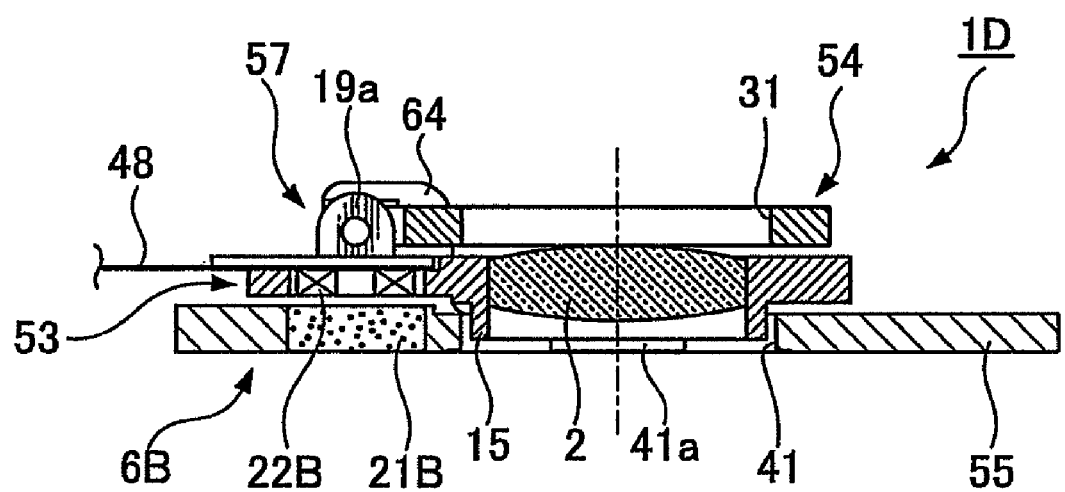
FIG. 26 is a cross-sectional view showing a fifth example of an image blur correction device according to an embodiment of the present invention.

FIG. 16 is a perspective view showing a fourth example of an image blur correction device according to an embodiment of the present invention. FIG. 17 is a plan view of the same. FIG. 18A is a front view of the same and FIG. 18B is a left side view of the same. FIG. 19A is a cross-sectional view of a part along a D-D line of the image blur correction device shown in FIG. 17, FIG. 19B is a cross-sectional view of a part along an E-E line of the same, and FIG. 19C is a cross-sectional view of a part along an F-F line of the same. FIG. 20 is an exploded perspective view of the fourth example. FIG. 21 is a perspective view showing components of the fourth example. FIG. 22 is a view describing a space resulting from applying a guide mechanism of the fourth example. FIGS. 23A and 23B are views describing a state where a first movable frame is placed in a reference position. FIGS. 24A and 24B are views describing a state where a first movable frame is moved to a (+) side in a first direction and a (+) side in a second direction. FIGS. 25A and 25B are views describing a state where a movable frame is moved to a (−) side in the first direction and a (−) side in the second direction. FIG. 26 is a cross-sectional view showing a fifth example of an image blur correction device according to an embodiment of the present invention.

Figure 27:
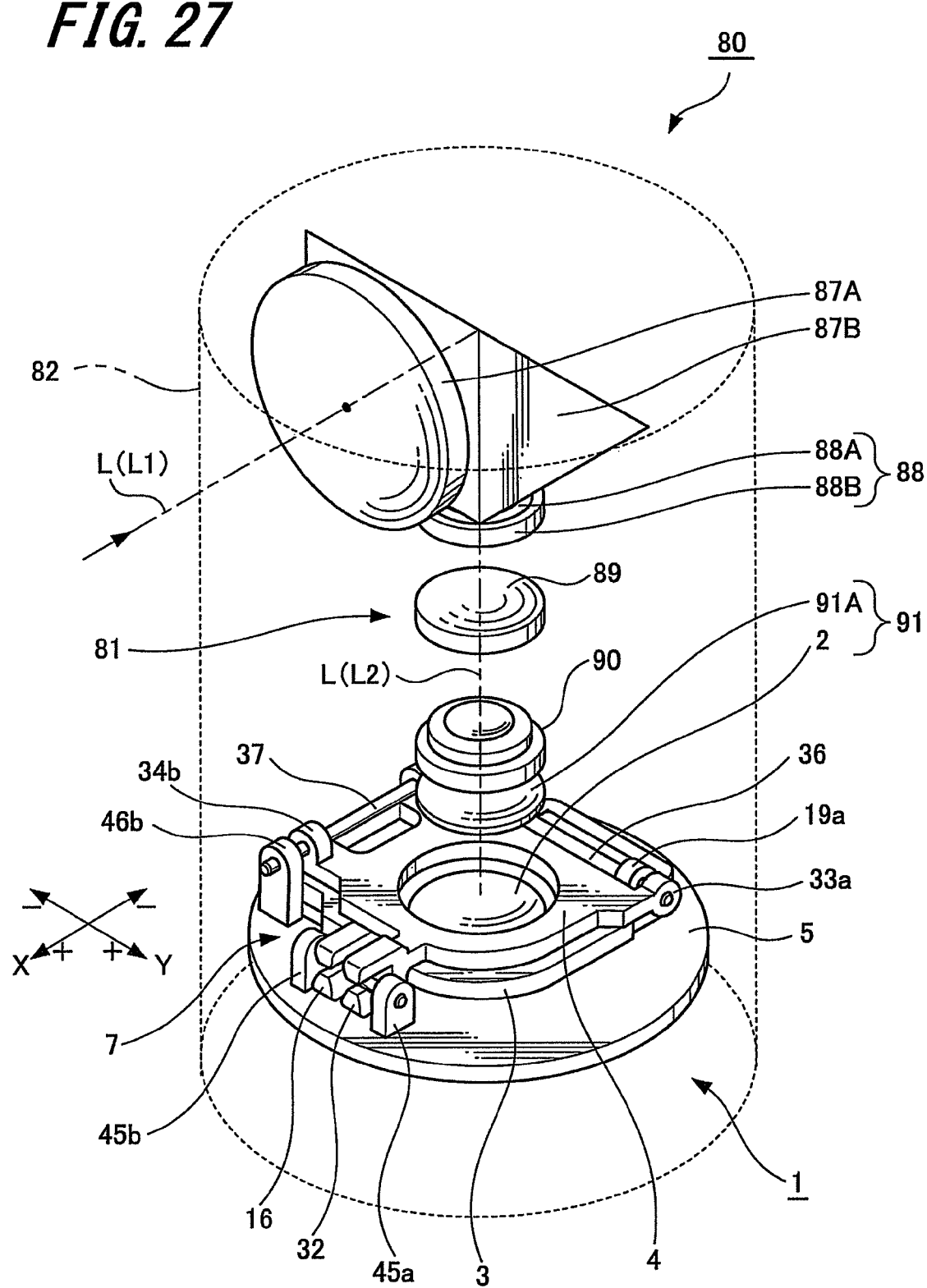
FIG. 27 is a perspective view showing a first example of a lens barrel according to an embodiment of the present invention.
Figure 28A:
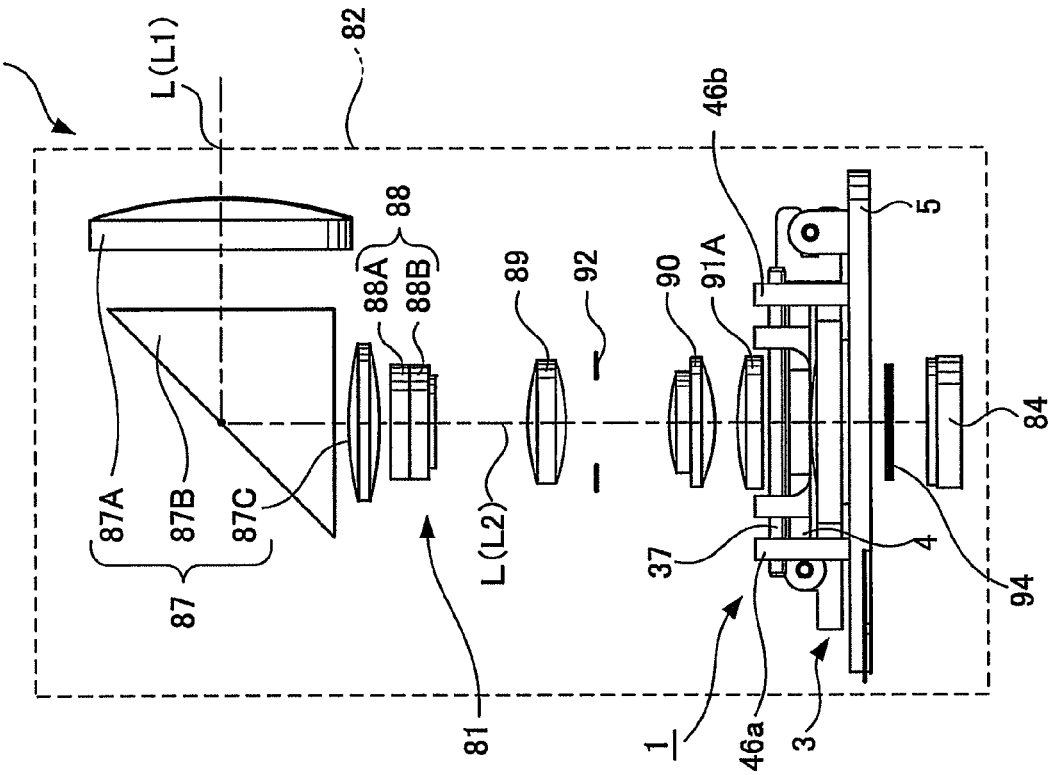
FIGS. 28A and 28B show a first example of a lens barrel according to an embodiment of the present invention, where
Figure 28B:
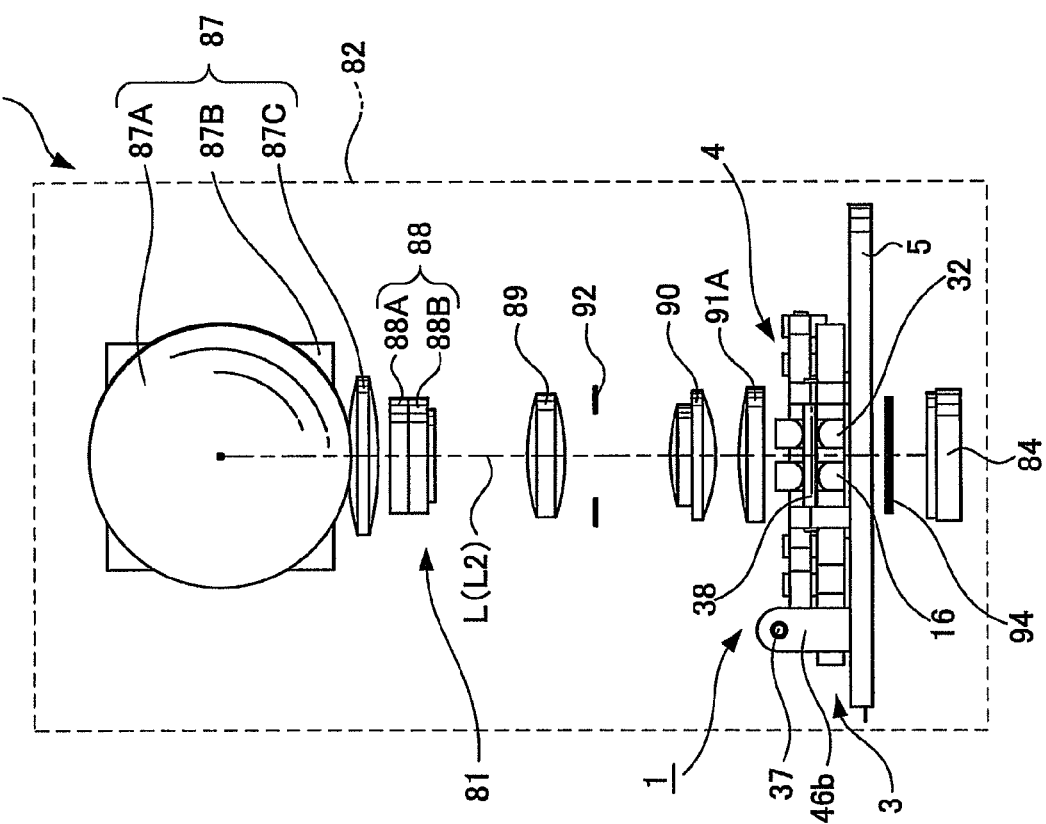
Figure 29:
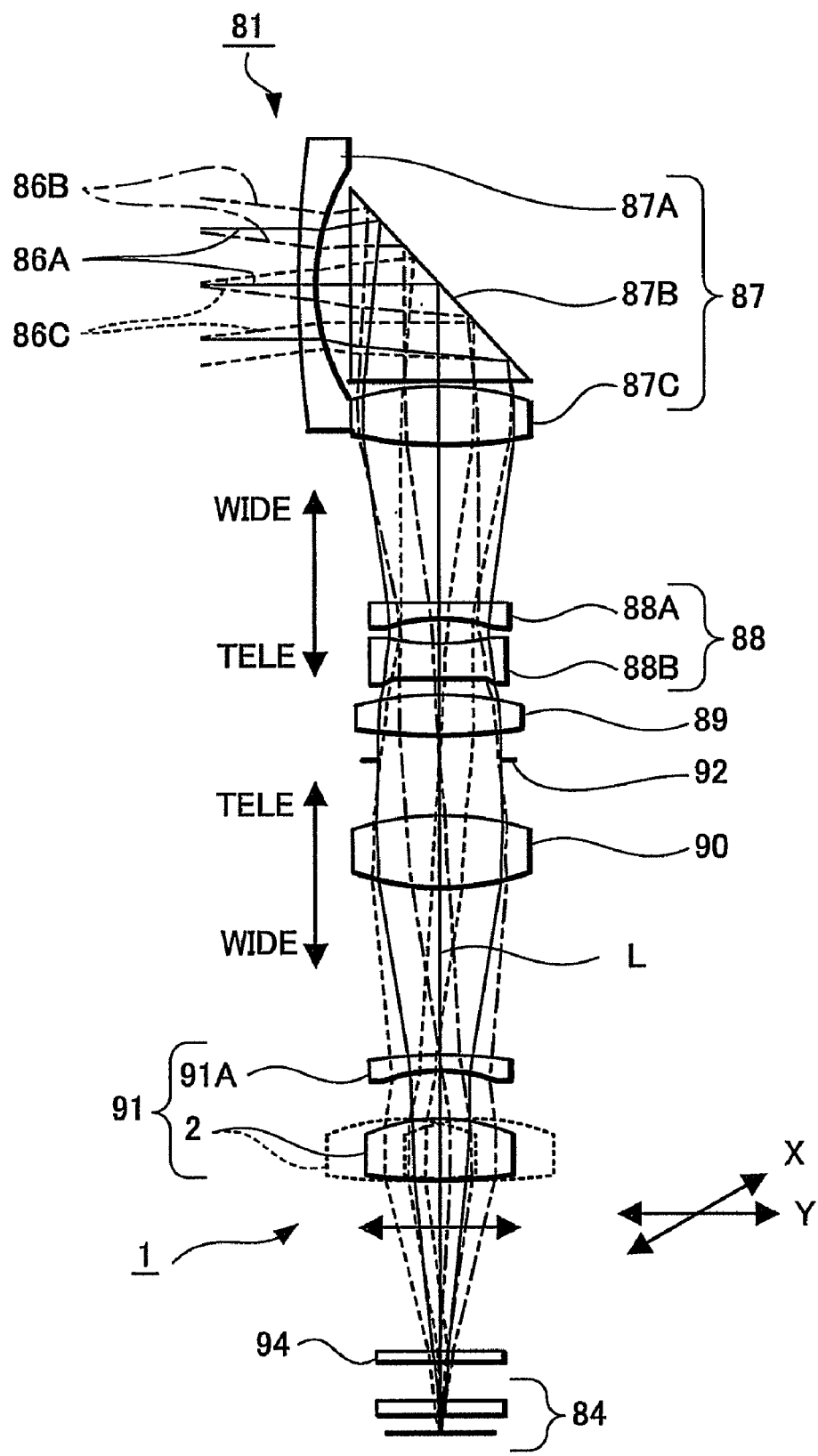
FIG. 29 is a view describing a configuration of a lens system of a first example of a lens barrel according to an embodiment of the present invention.
Figure 30:
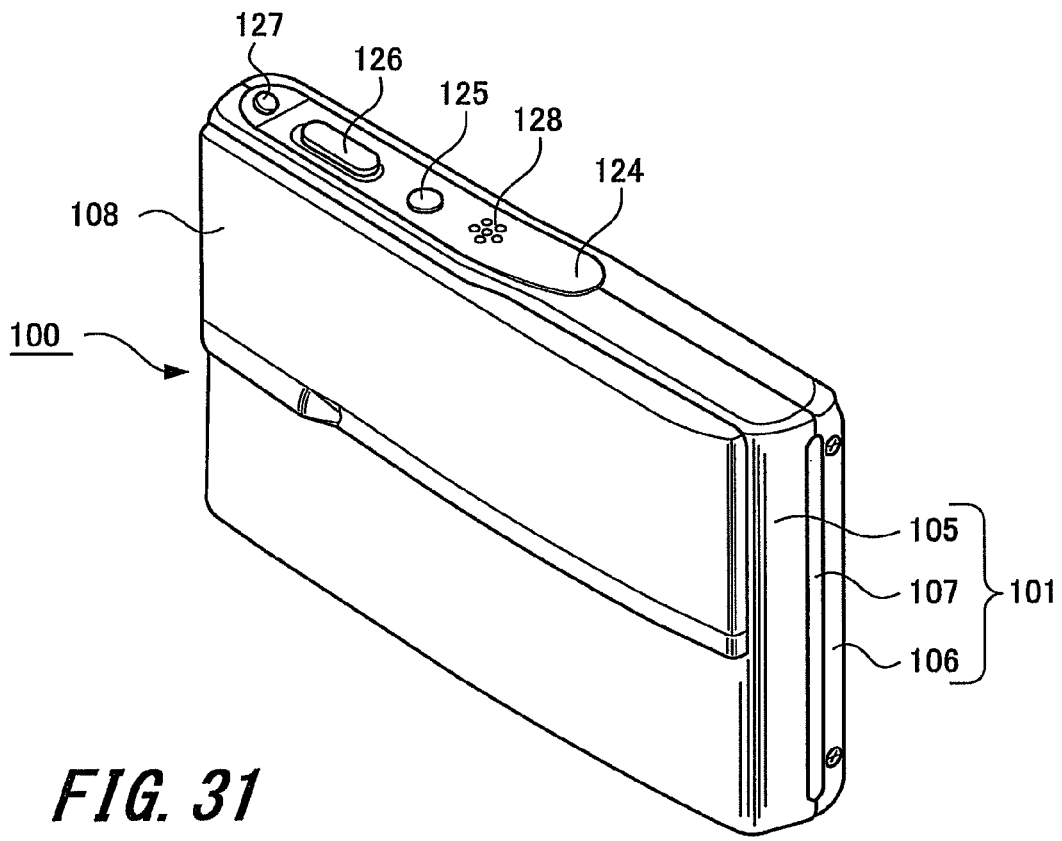
FIG. 30 is a front view of a first example of an imaging apparatus according to an embodiment of the present invention, where an objective lens is closed with a lens cover.
Figure 31:
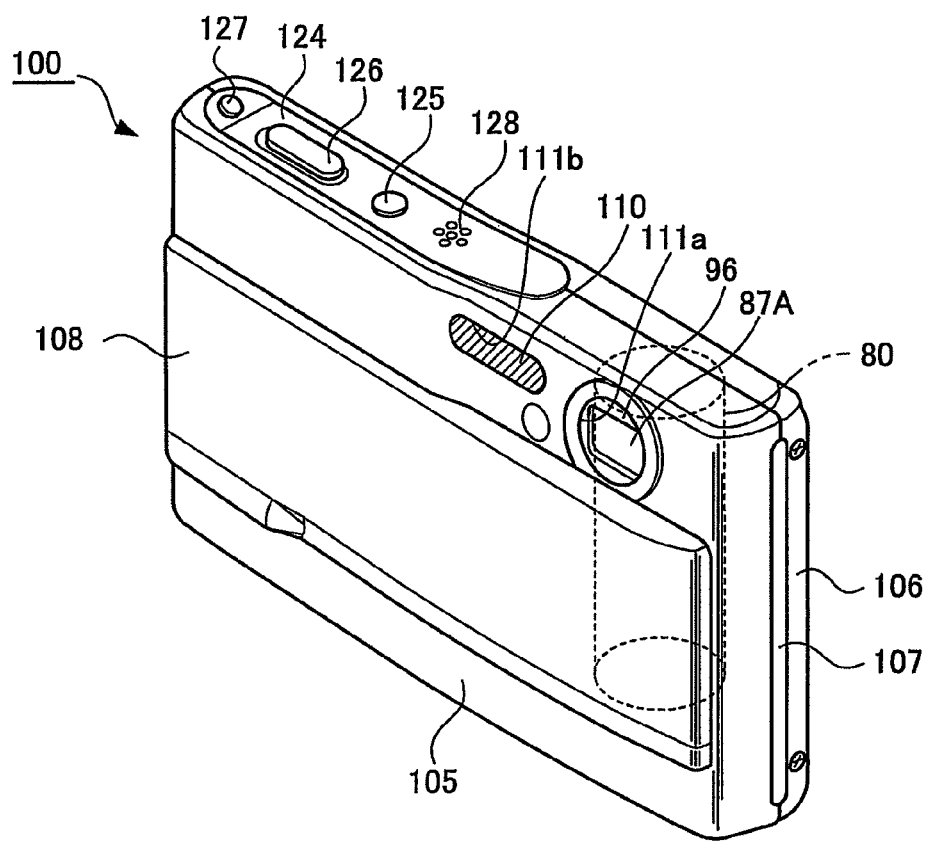
FIG. 31 is a front view of a first example of an imaging apparatus according to an embodiment of the present invention where an objective lens is exposed by opening a lens cover.
Figure 32:
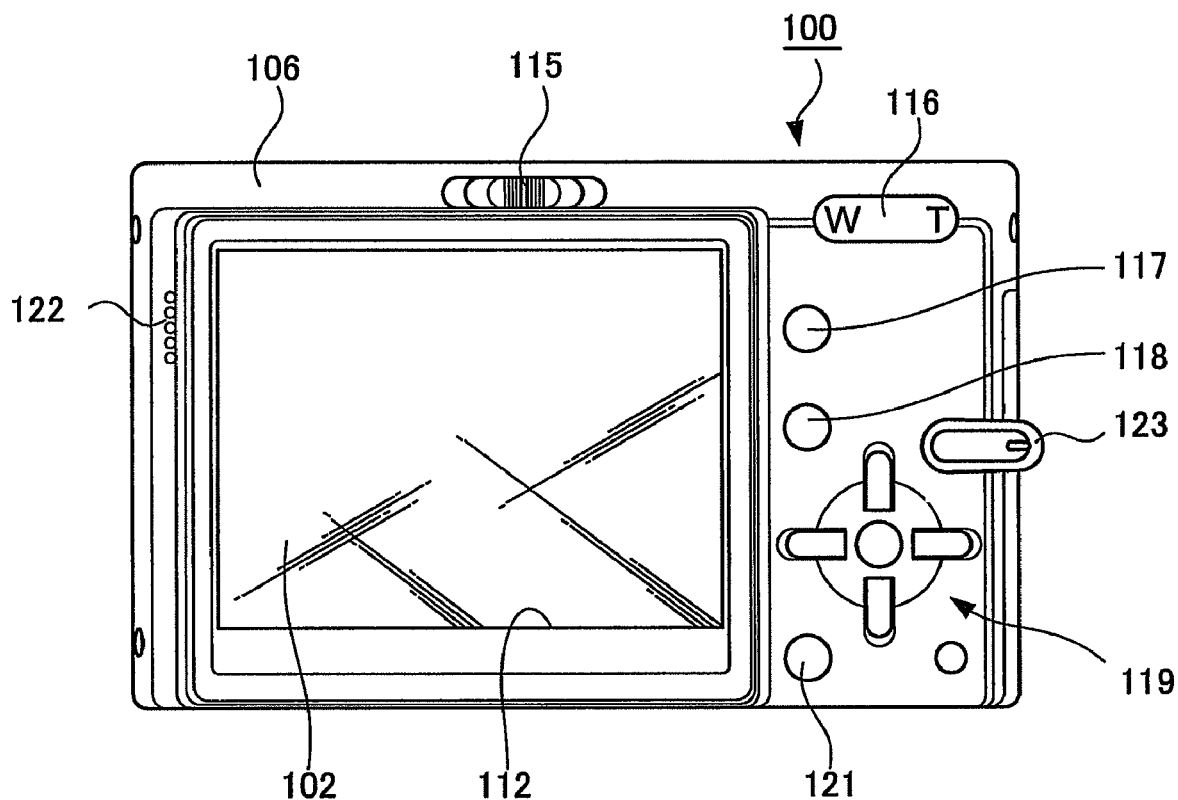
FIG. 32 is a rear view showing a first example of an imaging apparatus according to an embodiment of the present invention.
Figure 33:
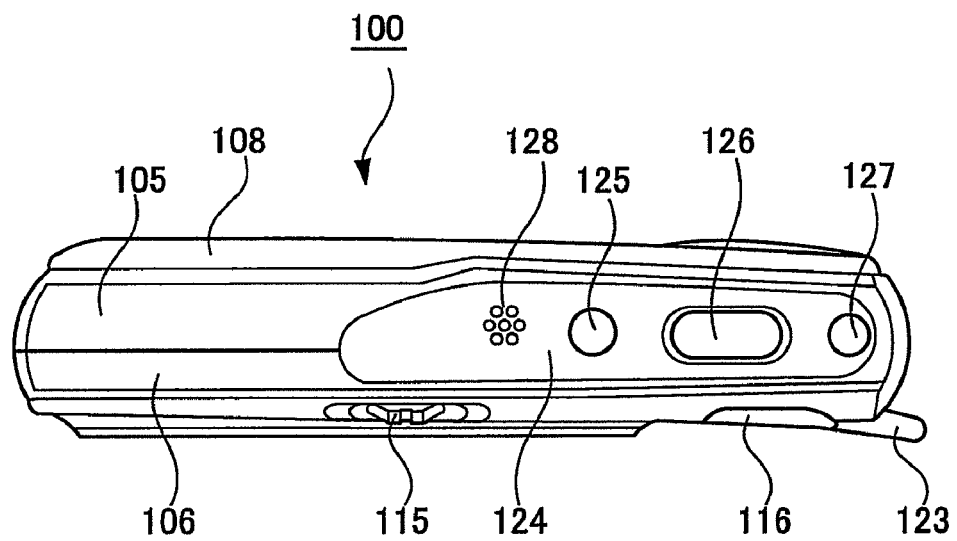
FIG. 33 is a plan view showing a first example of an imaging apparatus according to an embodiment of the present invention.
Figure 34:
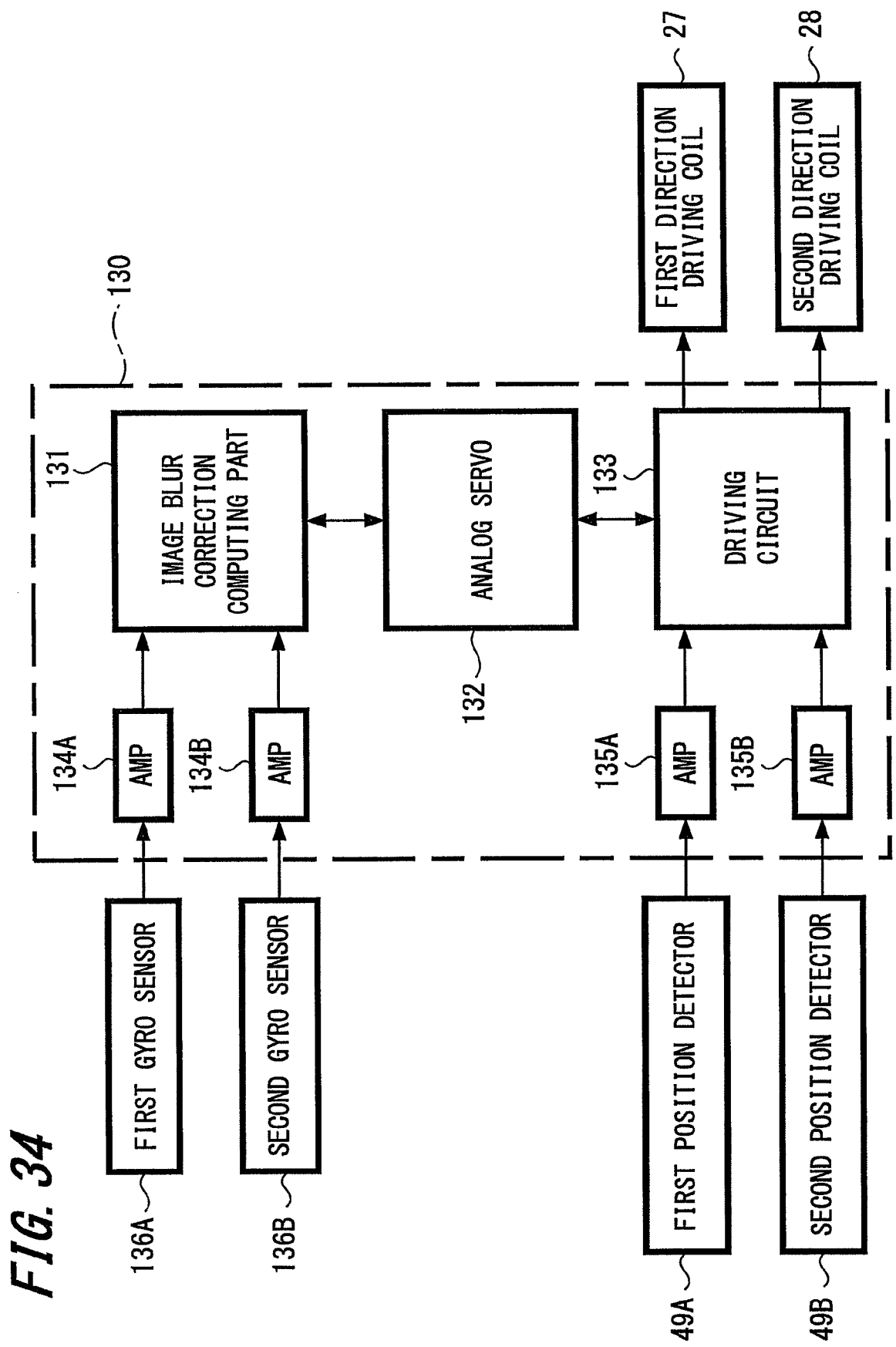
FIG. 34 is a block diagram for describing a control concept in an image blur correction device according to an embodiment of the present invention.
Figure 35:
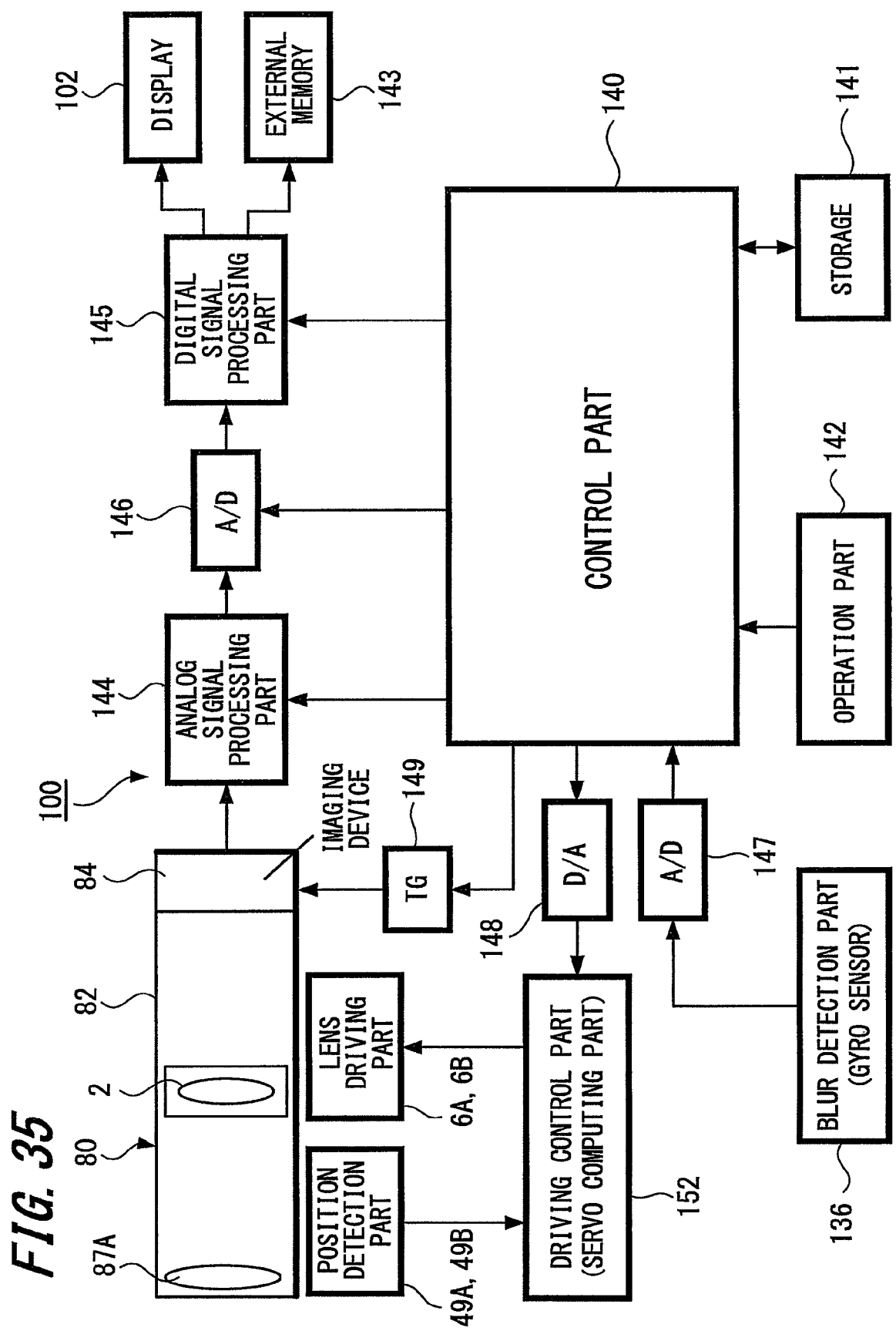
FIG. 35 is a block diagram showing a first example of a schematic configuration of an imaging apparatus according to an embodiment of the present invention.

FIGS. 27 to 29 show a first example of a lens barrel according to an embodiment of the present invention, where FIG. 27 is a perspective view, FIG. 28A is a front view, FIG. 28B is a left side view, and FIG. 29 is a view describing a configuration of a lens system. FIGS. 30 to 33 show a first example of an imaging apparatus according to an embodiment of the present invention, where FIG. 30 is a front perspective view, FIG. 31 is a perspective view where an objective lens is exposed by moving a lens cover, FIG. 32 is a rear view, and FIG. 33 is a plan view. FIG. 34 is a block diagram for describing a control concept in an image blur correction device according to an embodiment of the present invention. FIG. 35 is a block diagram showing a first example of a schematic configuration of an imaging apparatus according to an embodiment of the present invention. FIG. 36 is a block diagram showing a second example of a schematic configuration of the same imaging apparatus.

A first example of an image blur correction device according to an embodiment of the present invention shown in FIGS. 1 to 13 is formed as an image blur correction device 1 including a moving magnet-type driving mechanism. As shown in FIGS. 1 to 8, the image blur correction device 1 includes a correction lens 2, a first movable frame 3, a second movable frame 4, a fixed base 5, a driving part 6 and a guide mechanism 7. The correction lens 2 is configured to correct an image blur in a lens system. The first movable frame 3 holds the correction lens 2. The second movable frame 4 supports the first movable frame 3 to be movable in a first direction Y perpendicular to an optical axis of the lens system. The fixed base 5 supports the second movable frame 4 to be movable in a second direction X perpendicular to the optical axis of the lens system and perpendicular to the first direction Y. The driving part 6 includes a first electric actuator 6A moving the first movable frame 3 in the first direction Y; and a second electric actuator 6B moving the second movable frame 4 in the second direction X. The guide mechanism 7 has at least one guide shaft guiding both the first movable frame 3 and the second movable frame 4.

The correction lens 2 is configured to correct an image blur. The correction lens 2 is moved in the first direction Y and/or the second direction X (usually both the first direction Y and the second direction X) corresponding to an amount of image blur when a later-described camera main body shakes due to trembling or the like of hands. The first movable frame 3 holding the correction lens 2 is placed between the fixed base 5 and the second movable frame 4. The first movable frame 3 has a ring-shaped lens fixing part 11 and a pair of magnet fixing parts 12A and 12B provided integrally with the lens fixing part 11.

A fitting hole 13 is provided in a center of the lens fixing part 11. The correction lens 2 is fitted in the fitting hole 13 and fixed by a fixing device such as an adhesive. As shown in FIG. 8, a limiting projection 15 is provided on a surface of the lens fixing part 11 facing the fixed base 5. The limiting projection 15 forms a ring-shaped cylinder surrounding the fitting hole 13, and an inner surface of the limiting projection 15 is formed as an inner periphery of the fitting hole 13. As shown in FIG. 5C, the limiting protrusion 15 is inserted into a later-described limiting receiver 41 of the fixed base 5 and is engaged therewith to be movable in a radial direction within a predetermined range.

A first shaft engaging part 16 is provided at a side of the lens fixing part 11. The first shaft engaging part 16 is formed as an approximately U-shaped projection protruding laterally and has a pair of engaging pieces 16a and 16b facing each other in a thickness direction of the lens fixing part 11. The first shaft engaging part 16 is slidably engaged with a later-described third guide shaft 38.

The pair of magnet fixing parts 12A and 12B are provided at positions rotated and displaced at about 90° to each other on the outer periphery in a radial direction of the lens fixing part 11. The magnet fixing part 12B is provided opposite to the first shaft engaging part 16 across the fitting hole 13. The second direction X represents a direction of linking the magnet fixing part 12B and the first shaft engaging part 16. Specifically, the first shaft engaging part 16 is provided at the side of the lens fixing part 11 on the (+) side in the second direction X, and the magnet fixing part 12B continues at the side of the lens fixing part 11 on the (−) side in the second direction X. The first direction Y represents a direction of linking the magnet fixing part 12A and the fitting hole 13. The magnet fixing part 12A extends at the side of the lens fixing part 11 in the first direction Y.

The magnet fixing part 12A has a magnet fitting hole 17. The magnet fitting hole 17 is rectangular and has two long sides extending in the second direction X. A first magnet 21A forming part of the first electric actuator 6A is fixed to the magnet fitting hole 17 using an adhesive, fixing screws or another fixing method.

The magnet fixing part 12B has a magnet fixing hole 18; and a first main bearing 19 including two bearing pieces 19a and 19b. The magnet fitting hole 18 is rectangular and has two long sides extending in the first direction Y. A second magnet 21B forming part of the second electric actuator 6B is fixed to the magnet fitting hole 18 using an adhesive, fixing screws or another fixing method.

The two bearing pieces 19a and 19b of the first main bearing 19 protrude approximately perpendicularly from a surface of the magnet fixing part 12B facing the second movable frame 4 and are placed at a predetermined interval between them in the first direction Y. A bearing hole 19c penetrating in the first direction Y is provided in each of the two bearing pieces 19a and 19b. A later-described first guide shaft 36 is slidably inserted into and rotatably supported by each of the bearing holes 19c.

The first magnet 21A and the second magnet 21B are formed to have an identical shape as rectangular flat plates fit into the magnet fitting holes 17 and 18, respectively, and are polarized to generate a magnetic force having equal strength in a predetermined direction. That is, each of the first and second magnets 21A and 21B is equally divided into two parts with different polarities in a plane direction and is also equally divided into two parts with different polarities in a thickness direction perpendicular to the plane direction.

In this example, as shown in FIG. 7, the first magnet 21A has a north pole polarized on a side close to the correction lens 2 on a surface facing the fixed base 5 (a surface close to a later-described first coil 22A) and has a south pole polarized on a side away from the correction lens 2 on that surface. The first magnet 21A has a south pole polarized on a side close to the correction lens 2 on a surface facing the second movable frame 4 and has a north pole polarized on a side away from the correction lens 2 on that surface.

The second magnet 21B has a north pole polarized on a side close to the correction lens 2 on a surface facing the fixed base 5 (a surface close to a later-described second coil 22B) and has a south pole polarized on a side away from the correction lens 2 on that surface. The second magnet 21B has a south pole polarized on a side close to the correction lens 2 on a surface facing the second movable frame 4 and has a north pole polarized on a side away from the correction lens 2 on that surface. Arrangement of polarity in the first and second magnets 21A and 21B is not limited to this example. The poles can be arranged with reverse polarities in the plane and thickness directions.

The second movable frame 4 is formed as a ring-shaped hollow member and has a through-hole 31 in the center facing the fitting hole 13 of the first movable frame 3. A second shaft engaging part 32 is provided at the side of the second movable frame 4 on the (+) side in the second direction X. Similar to the first shaft engaging part 16 of the first movable frame 3, the second shaft engaging part 32 is formed as an approximately U-shaped projection protruding laterally and has a pair of engaging pieces 32a and 32b facing each other in a thickness direction of the second movable frame 4. The second shaft engaging part 32 is slidably engaged with the later-described third guide shaft 38 together with the first shaft engaging part 16.

A second main bearing 33 including two bearing pieces 33a and 33b is provided at the side of the second movable frame 4 on the (−) side in the second direction X. The two bearing pieces 33a and 33b of the second main bearing 33 are placed at a predetermined interval between them in the first direction Y and protrude laterally. Both edges of the first guide shaft 36 are supported by the two bearing pieces 33a and 33b by press-fit fixation. The first guide shaft 36 supported by the second main bearing 33 extends in the first direction Y.

A third main bearing 34 including two bearing pieces 34a and 34b is provided on an edge on the (−) side in the first direction Y of a surface opposite to a surface of the second movable frame 4 facing the first movable frame 3. The two bearing pieces 34a and 34b of the third main bearing 34 are placed at a predetermined interval between them in the second direction X. A second guide shaft 37 penetrates the two bearing pieces 34a and 34b in the second direction X. A middle of the second guide shaft 27 is press-fit fixed to the two bearing pieces 34a and 34b.

The fixed base 5 is formed of a round plate larger than a plane shape of the first and second movable frames 3 and 4. The fixed base 5 has: the limiting receiver 41 formed as a through-hole facing the fitting hole 13 of the first movable frame 3; a coil insertion hole 42 into which the first coil 22A forming part of the first electric actuator 6A is inserted; and a coil insertion hole 43 into which the second coil 22B forming part of the second electric actuator 6B is inserted.

The limiting receiver 41 of the fixed base 5 is approximately octagonal as a whole. The limiting receiver 41 has: first stopper surfaces 41a and 41b that are flat surfaces facing each other and perpendicular to the first direction Y; and second stopper surfaces 41c and 41d that are flat surfaces facing each other and perpendicular to the second direction X. The first stopper surfaces 41a and 41b and the second stopper surfaces 41c and 41b are set to have an equal distance to a center of the limiting receiver 41. The limiting projection 15 of the first movable frame 3 is brought into contact with the four stopper surfaces 41a to 41d to limit a range of movement of the first movable frame 3 in a direction perpendicular to the optical axis of the lens system.

A limiting receiver according to another example of the embodiment may be quadrangular with the aforementioned four stopper surfaces 41a to 41d, for example. A limiting receiver according to further another example of the embodiment may also be circular. In this case, the circular limiting receiver is set to have a center coincident with a center of the first movable frame 3 placed in a reference position.

The coil insertion hole 42 is formed in a position corresponding to the first magnet 21A attached to the first movable frame 3. The coil insertion hole 43 is formed in a position corresponding to the second magnet 21B attached to the first movable frame 3. Accordingly, the first coil 22A inserted into the coil insertion hole 42 faces the first magnet 21A, and the second coil 22B inserted into the coil insertion hole 43 faces the second magnet 21B.

An auxiliary bearing 45 including two bearing pieces 45a and 45b; and a fourth main bearing 46 including two bearing pieces 46a and 46b are provided on a surface of the fixed base 5 facing the first movable frame 3. On the fixed base 5, the two bearing pieces 45a and 45b of the auxiliary bearing 45 are provided on an edge on the (+) side in the second direction X and placed at a predetermined interval between them in the first direction Y. Both edges of the third guide shaft 38 are supported by the two bearing pieces 45a and 45b by press-fit fixation. The third guide shaft 38 supported by the auxiliary bearing 45 extends in the first direction Y.

In the fixed base 5, the two bearing pieces 46a and 46b of the fourth main bearing 46 are provided on an edge on the (−) side in the first direction Y and placed at a predetermined interval between them in the second direction X. A bearing hole 46c penetrating in the second direction X is provided in each of the two bearing pieces 46a and 46b. Protrusions on both edges of the second guide shaft 37 press-fit fixed to the third main bearing 34 of the second movable frame 4 are slidably inserted into and rotatably supported by the bearing holes 46c, respectively.

As shown in FIG. 3, a wiring board recess 47 is provided on a surface opposite to the surface of the fixed base 5 facing the first movable frame 3. A flexible wiring board 48 is fitted in the wiring board recess 47 and fixed thereto using an adhesive, fixing screws or another fixing method.

As shown in FIG. 7, the flexible wiring board 48 has: a first coil mounting part 48a; a second coil mounting part 48b; and a connection part 48c connecting the coil mounting parts 48a and 48b to each other. The first coil 22A and a first hole element 49A that is a specific example of a position detector are mounted on the first coil mounting part 48a. The second coil 22B and a second hole element 49B that is a specific example of a position detector are mounted on the second coil mounting part 48b.

Each of the first and second coils 22A and 22B is approximately oval flat coil formed by planarly winding one coil wire. The two coils 22A and 22B are electrically connected to predetermined wiring patterns provided in the first coil mounting part 48a and the second coil mounting part 48b, respectively.

As shown in FIG. 7, in the first coil 22A, two straight line parts on a long side facing each other in a width direction form thrust generation parts 23a and 23b each generating thrust as an actuator. Similarly, in the second coil 22B, two straight line parts on a long side facing each other in a width direction form thrust generation parts 24a and 24b each generating thrust as an actuator. The first coil 22A is provided so that the thrust generation parts 23a and 23b extend in a direction perpendicular to the first direction Y. The second coil 22A is provided so that the thrust generation parts 24a and 24b extend in a direction perpendicular to the second direction X.

The first coil 22A is inserted into the coil insertion hole 42 of the fixed base 5 in the image blur correction device 1 assembled. The thrust generation part 23a of the first coil 22A faces one magnetic pole of the first magnet 21A (north pole in this example). The thrust generation part 23b faces the other magnetic pole of the first magnet 21A (south pole in this example). Similarly, the second coil 22B is inserted into the coil insertion hole 43 of the fixed base 5 in the image blur correction device 1 assembled. The thrust generation part 24a of the second coil 22B faces one magnetic pole of the second magnet 21B (north pole in this example). The thrust generation part 24b faces the other magnetic pole of the second magnet 21B (south pole in this example).

As shown in FIG. 9, the first hole element 49A has a detection part placed in a position almost overlapping a boundary between the north pole and the south pole (polar boundary) in the first magnet 21A. The first hole element 49A detects a magnetic force of the first magnet 21A and outputs a detection signal according to intensity of the detected magnetic force. A control part calculates a position of the correction lens 2 in the first direction Y based on the detection signal supplied from the first hole element 49A.

The second hole element 49B has a detection part placed in a position almost overlapping a boundary between the north pole and the south pole (polar boundary) in the second magnet 21B. The second hole element 49B detects a magnetic force of the second magnet 21B and outputs a detection signal according to intensity of the detected magnetic force. The control part calculates a position of the correction lens 2 in the second direction X based on the detection signal supplied from the second hole element 49B. Accordingly, the control part acquires information on positions of the correction lens 2 in the first direction Y and the second direction X and outputs a predetermined control signal to control driving of the correction lens 2 based on the position information.

The first electric actuator 6A includes the first magnet 21A attached to the first movable frame 3 and the first coil 22A attached to the fixed base 5. The first electric actuator 6A generates thrust to move the first movable frame 3 in the first direction Y. The second electric actuator 6B includes the second magnet 21B attached to the first movable frame 3 and the second coil 22B attached to the fixed base 5. The second electric actuator 6B generates thrust to move the second movable frame 4 in the second direction X through the first movable frame 3.

Here, thrust generated by the first and second electric actuators 6A and 6B will be described. When current is caused to flow in the first coil 22A, thrust directed in the first direction Y is generated in the first electric actuator 6A by the Fleming's left-hand rule, because a magnetic force of the first magnet 21A acts in a direction perpendicular to the first coil 22A. In this case, the first coil 22A has the two thrust generation parts 23a and 23b formed of straight line parts each generating thrust, where current flows in directions reverse to each other. However, since the magnetic force of the first magnet 21A acts on the two thrust generation parts 23a and 23b also in directions reverse to each other, the two thrust generation parts 23a and 23b generate thrust in an identical direction.

Similarly, when current is caused to flow in the second coil 22B, thrust directed in the second direction X is generated in the second electric actuator 6B by the Fleming's left-hand rule, because a magnetic force of the second magnet 21B acts in a direction perpendicular to the second coil 22B. Also in this case, since the magnetic force of the second magnet 21B acts on the two thrust generation parts 24a and 24b of the second coil 22B in directions reverse to each other, the two thrust generation parts 24a and 24b where current flows in directions reverse to each other generate thrust in an identical direction.

The guide mechanism 7 includes a first guide mechanism guiding the first movable frame 3 in the first direction Y; and a second guide mechanism guiding the first movable frame 3 in the second direction X through the second movable frame 4.

The first guide mechanism includes the first main bearing 19 and the first shaft engaging part 16 of the first movable frame 3; the second main bearing 33 of the second movable frame 4; the auxiliary bearing 45 of the fixed base 5; the first guide shaft 36 as a first main shaft; and the third guide shaft 38 as an auxiliary shaft. The second guide mechanism includes the third main bearing 34 and the second shaft engaging part 32 of the second movable frame 4; the auxiliary bearing 45 and the fourth main bearing 46 of the fixed base 5; the second guide shaft 37 as a second main shaft; and the third guide shaft 38 as an auxiliary shaft.

In the guide mechanism 7 according to the present embodiment, the third guide shaft 38 is formed as a common auxiliary shaft for the first and second guide mechanisms. That is, the third guide shaft 38 guides both the first movable frame 3 and the second movable frame 4. Therefore, it is possible to reduce one of four guide shafts used in the related art. Accordingly, as shown in FIG. 10, it is not necessary to ensure a space for placing the fourth guide shaft in the related art (hatched part S1), so that the device may be reduced in size. As a result, members forming a lens barrel such as shutter, focus and zoom mechanisms may be placed in the space indicated by the hatched part S1. This may contribute to a reduction of a lens barrel and an imaging apparatus in size.

The image blur correction device 1 having the aforementioned configuration may be assembled as follows, for example. First, the correction lens 2 and the two magnets 21A and 21B are fitted in the fitting hole 13 and the two magnet fitting holes 17 and 18 in the first movable frame 3 and fixed thereto using an adhesive or other fixing methods. Accordingly, a first movable frame assembly is formed with the first movable frame 3, the correction lens 2 and the two magnets 21A and 21B integrated.

Next, the second movable frame 4 is allowed to face one surface of the first movable frame assembly, and the first main bearing 19 of the first movable frame 3 is allowed to be arranged between the two bearing pieces 33a and 33b of the second main bearing 33 of the second movable frame 4. Then, the first guide shaft 36 is allowed to penetrate the bearing holes 19c provided to the bearing pieces 19a and 19b of the first main bearing 19 and the through-holes of the two bearing pieces 33a and 33b, and both edges of the first guide shaft 36 are press-fit fixed to the two bearing pieces 33a and 33b. Accordingly, the first movable frame 3 is supported by the second movable frame 4 to be movable in the first direction Y that is one specified direction.

Next, as shown in FIG. 7, the first coil 22A and the first hole element 49A are mounted on one surface of the first coil mounting part 48a of the flexible wiring board 48, and the second coil 22B and the second hole element 49B are mounted on one surface of the second coil mounting part 48b of the flexible wiring board 48. Accordingly, a coil assembly is formed with the flexible wiring board 48, the two coils 22A and 22B and the two hole elements 49A and 49B integrated.

Next, the flexible wiring board 48 of the coil assembly is fitted in the wiring board recess 47 on the fixed base 5 and fixed thereto using an adhesive, fixing screws, or other fixing methods. Accordingly, a fixed base assembly is formed with the fixed base 5 and the coil assembly integrated. Here, as shown in FIG. 6, the two coils 22A and 22B and the two hole elements 49A and 49B are inserted into the two coil insertion holes 42 and 43 of the fixed base 5. The steps until the fixed base assembly is formed may be performed before the steps until the first movable frame 3 is allowed to be movably supported by the second movable frame 4.

Next, the first movable frame 3 supported by the second movable frame 4 is allowed to face the fixed base assembly, and the first shaft engaging part 16 of the first movable frame 3 and the second shaft engaging part 32 of the second movable frame 4 are allowed to be slidably engaged with the third guide shaft 38 fixed to and supported by the auxiliary bearing 45 of the fixed base 5. Here, the limiting projection 15 of the first movable frame 3 is inserted into the limiting receiver 41 of the fixed base 5 to limit ranges of movement of the first movable frame 3 and the second movable frame 4.

While the two shaft engaging parts 16 and 32 are allowed to be slidably engaged with the third guide shaft 38, the third main bearing 34 of the second movable frame 4 is allowed to be arranged between the two bearing pieces 46a and 46b of the fourth main bearing 46 of the fixed base 5. Then, the second guide shaft 37 is allowed to penetrate the bearing holes 46c provided to the bearing pieces 46a and 46b of the fourth main bearing 46 and the through-holes of the two bearing pieces 34a and 34b of the third main bearing 34, and a middle of the second guide shaft 37 is press-fit fixed to the two bearing pieces 34a and 34b. Here, the second guide shaft 37 protrudes from the two bearing pieces 34a and 34b almost equally in length. Accordingly, the second movable frame 4 is supported by the fixed base 5 to be movable in the second direction X which is one specified direction, so that the work for assembling the image blur correction device 1 is completed. As a result, the image blur correction device 1 is obtained having a configuration as shown in FIGS. 1 to 5.

The first movable frame 3, the second movable frame 4 and the fixed base 5 are positioned by providing predetermined positioning holes in the respective members and inserting reference pins into the positioning holes, for example. Accordingly, the first movable frame 3 is relatively and temporarily fixed to the second movable frame 4 and the second movable frame 4 is relatively and temporarily fixed to the fixed base 5, making it possible to position the members in an accurate and simplified manner.

FIG. 11A is a plan view showing a state where the first movable frame 3 is in a reference position and a center of the correction lens 2 corresponds to a center of the limiting receiver 41. FIG. 11B is a bottom view of the same state. As shown in FIG. 11B, ranges of movement of the first movable frame 3 and the second movable frame 4 are determined by engagement of the limiting projection 15 of the first movable frame 3 with the limiting receiver 41 of the fixed base 5.

In the state where the first movable frame 3 is placed in the reference position, the first movable frame 3 is movable to a (+) side in the first direction Y within a distance L from the first stopper surface 41a of the limiting receiver 41 to an outer surface of the limiting projection 15. The distance L is selected to be shorter than a distance M between the two shaft engaging parts 16 and 32 shown in FIG. 11A. This makes it possible to prevent interference between the first shaft engaging part 16 and the second shaft engaging part 32 when the first movable frame 3 is moved to the (+) side in the first direction Y.

The image blur correction device 1 with such a configuration has the following action, for example. The correction lens 2 in the image blur correction device 1 is moved by supplying an appropriate value of driving current selectively or simultaneously to the respective coils 22A and 22B of the first and second electronic actuators 6A and 6B through the flexible wiring board 48.

The first coil 22A and the second coil 22B of the image blur correction device 1 are fixed to the fixed base 5 through the flexible wiring board 48. Here, each of the thrust generation parts 23a and 23b of the first coil 22A extends in the second direction X, and each of the thrust generation parts 24a and 24b of the second coil 22B extends in the first direction Y. The first magnet 21A fixed to the first movable frame 3 is placed facing the first coil 22A, and the second magnet 21B fixed thereto is placed facing the second coil 22B.

As a result, a magnetic flux of a magnetic circuit formed with the first magnet 21A acts through each of the thrust generation parts 23a and 23b of the first coil 22A approximately perpendicularly. Similarly, a magnetic flux of a magnetic circuit formed with the second magnet 21B acts through each of the thrust generation parts 24a and 24b of the second coil 22B approximately perpendicularly. Each of the magnets 21A and 21B is fixed to the first movable frame 3 supported by the fixed base 5 to be movable through the second movable frame 4. Therefore, the correction lens 2 may be moved through the first movable frame 3 within a predetermined range in any direction on a plane including the first direction Y and the second direction X, that is, within a range limited by the limiting projection 15 and the limiting receiver 41.

When current is caused to flow in the first coil 22A of the first electric actuator 6A, the current flows in the second direction X in each of the thrust generation parts 23a and 23b of the first coil 22A, because each of the thrust generation parts 23a and 23b extends in the second direction X. Here, since a magnetic flux of the first magnet 21A acts in a direction approximately perpendicular to each of the thrust generation parts 23a and 23b, thrust directed in the first direction Y acts on the first magnet 21A according to the Fleming's rule. Accordingly, the first movable frame 3 to which the first magnet 21A is fixed is moved in the first direction Y. As a result, the correction lens 2 held in the first movable frame 3 is moved in the first direction Y in response to a magnitude of current caused to flow in the first coil 22A.

Similarly, when current is caused to flow in the second coil 22B of the second electric actuator 6B, the current flows in the first direction Y in each of the thrust generation parts 24a and 24b of the second coil 22B, because each of the thrust generation parts 24a and 24b extends in the first direction Y. Here, since a magnetic flux of the second magnet 21B acts in a direction approximately perpendicular to each of the thrust generation parts 24a and 24b, thrust directed in the second direction X acts on the second magnet 21B according to the Fleming's rule. Accordingly, the first movable frame 3 to which the second magnet 21B is fixed is moved in the second direction X through the second movable frame 4. As a result, the correction lens 2 held in the first movable frame 3 is moved in the second direction X in response to a magnitude of current caused to flow in the second coil 22B.

When current is caused to flow both in the first coil 22A and the second coil 22B, a movement caused by the first coil 22A and a movement caused by the second coil 22B are performed in a combined manner. That is, the correction lens 2 is moved in the first direction Y by an action of current flowing in the first coil 22A, and at the same time, the correction lens 2 is moved in the second direction X by an action of current flowing in the second coil 22B. As a result, the correction lens 2 is obliquely moved to correct an image blur.

FIG. 12A is a plan view showing a state where the first movable frame 3 is moved to the (+) side in the first direction Y and the (+) side in the second direction X. FIG. 12B is a bottom view of the same state. The first movable frame 3 provided with thrust directed to the (+) side in the first direction Y and the (+) side in the second direction X is moved to the (+) side in the first direction Y along the first guide shaft 36 and moved to the (+) side in the second direction X through the second movable frame 4 moved along the second guide shaft 37.

In this case, the first shaft engaging part 16 of the first movable frame 3 slides to the (+) side in the first direction Y and the (+) side in the second direction X, that is, in an oblique direction while being engaged with the third guide shaft 38, and the second shaft engaging part 32 of the second movable frame 4 slides to the (+) side in the second direction X while being engaged with the guide shaft 38. Then, as shown in FIG. 12A, the first shaft engaging part 16 approaches the second shaft engaging part 32.

In this example, the distance L on the (+) side in the first direction Y from the reference position passed by the first movable frame 3 is set smaller than the distance M between the two shaft engaging parts 16 and 32 in the reference position (see FIGS. 11A and 11B). This makes it possible to prevent interference between the first shaft engaging part 16 and the second shaft engaging part 32 even if the first movable frame 3 is moved to the (+) side in the first direction Y and the first shaft engaging part 16 approaches the second engaging part 32.

FIG. 13A is a plan view showing a state where the first movable frame 3 is moved to the (−) side in the first direction Y and the (−) side in the second direction X. FIG. 13B is a bottom view of the same state. The first movable frame 3 provided with thrust directed to the (−) side in the first direction Y and the (−) side in the second direction X is moved to the (−) side in the first direction Y along the first guide shaft 36 and moved to the (−) side in the second direction X through the second movable frame 4 moved along the second guide shaft 37.

Here, the first shaft engaging part 16 of the first movable frame 3 slides to the (−) side in the first direction Y and the (−) side in the second direction X, that is, in an oblique direction while being engaged with the third guide shaft 38, and the second shaft engaging part 32 of the second movable frame 4 slides to the (−) side in the second direction X while being engaged with the guide shaft 38. In this case, as shown in FIG. 13A, the first shaft engaging part 16 and the second shaft engaging part 32 may not interfere with each other, because the first shaft engaging part 16 is moved away from the second shaft engaging part 32.

FIG. 14 is a plan view describing an image blur correction device 1A showing a second example of an image blur correction device according to an embodiment of the present invention. The image blur correction device 1A has a configuration similar to that of the image blur correction device 1 showing the first example and differs from the image blur correction device 1 only in terms of arrangement of the auxiliary bearing 45, the third guide shaft 38 and the two shaft engaging parts 16 and 32. Therefore, repeated description of the same parts as in the image blur correction device 1 is omitted here by attaching the same reference symbols.

The auxiliary bearing 45 of the image blur correction device 1A is provided on an edge in a middle part between the (+) side in the first direction Y and the (+) side in the second direction X on a surface of the fixed base 5 facing the first movable frame 3. The two bearing pieces 45a and 45b of the auxiliary bearing 45 are arranged at a predetermined interval between them in a direction at approximately 45° to the first direction Y and the second direction X and perpendicular to a radial direction of the fixed base 5.

Both edges of the third guide shaft 38 are supported by the two bearing pieces 45a and 45b by press-fit fixation. Accordingly, the third guide shaft 38 is placed opposite to the first guide shaft 36 and the second guide shaft 37 across the correction lens 2. The third guide shaft 38 supported by the auxiliary bearing 45 extends in a direction at approximately 45° to the first direction Y and the second direction X and perpendicular to the radial direction of the fixed base 5.

The first shaft engaging part 16 of the image blur correction device 1A is provided to the first movable frame 3 on a corner corresponding to the position where the third guide shaft 38 is arranged on the fixed base 5. The first shaft engaging part 16 is formed as a laterally protruding approximately U-shaped projection and has a pair of engaging pieces facing each other in a thickness direction of the lens fixing part 11. The second shaft engaging part 32 of the image blur correction device 1A is provided to the second movable frame 4 on a corner where the third guide shaft 38 is arranged. Similar to the first shaft engaging part 16, the second shaft engaging part 32 is formed as a laterally protruding approximately U-shaped projection and has a pair of engaging pieces facing each other in a thickness direction of the second movable frame 4.

In a state where a center of the correction lens 2 corresponds to a center of the limiting receiver 41 provided in the fixed base 5, the first shaft engaging part 16 is kept distant from the second shaft engaging part 32 at a predetermined distance in the first direction Y and the second direction X. The distance between the two shaft engaging parts 16 and 32 in the two directions is set longer than a distance L at which the first movable frame 3 is movable with respect to the second movable frame 4. This makes it possible to prevent interference between the first shaft engaging part 16 and the second shaft engaging part 32 when the first movable frame 3 and the second movable frame 4 are moved in the first direction Y and the second direction X.

The image blur correction device 1A having such a configuration may also exhibit the same effect as in the image blur correction device 1 of the first example. That is, the third guide shaft 38 is used to guide both the first movable frame 3 and the second movable frame 4. Therefore, it is possible to reduce one of four guide shafts used in the related art. Accordingly, it is not necessary to ensure a space for placing the fourth guide shaft in the related art, so that the image blur correction device may be reduced in size. This may contribute to a reduction of a lens barrel and an imaging apparatus in size.

In this example, the third guide shaft 38 is placed opposite to the first guide shaft 36 and the second guide shaft 37 across the correction lens 2. Accordingly, it is possible to ensure a long distance between the first main bearing 19 and the first shaft engaging part 16 and a long distance between the fourth main bearing 46 and the second shaft engaging part 32. This makes it possible to suppress backlash of the first movable frame 3 occurring due to a clearance between the first guide shaft 36 and the two bearing pieces 19a and 19b and a clearance between the third guide shaft 38 and the first shaft engaging part 16 and an inclination of an optical axis of the correction lens 2 caused by the backlash. This also makes it possible to suppress backlash of the second movable frame 4 occurring due to a clearance between the second guide shaft 37 and the two bearing pieces 46a and 46b and a clearance between the third guide shaft 38 and the second shaft engaging part 32 and an inclination of the optical axis of the correction lens 2 caused by the backlash. As a result, an inclination of the correction lens 2 may be reduced and image blur correction may be realized with high accuracy.

FIG. 15 is a cross-sectional view describing an image blur correction device 1B showing a third example of an image blur correction device according to an embodiment of the present invention. The image blur correction device 1B includes a moving coil-type electronic actuator. That is, the two magnets 21A and 21B in the image blur correction device 1 showing the first example are arranged on the fixed base 5 in the image blur correction device 1B. The two coils 22A and 22B in the image blur correction device 1 are arranged on the first movable frame 3 in the image blur correction device 1B. The other configuration is the same as that of the image blur correction device 1 of the first example and therefore repeated description is omitted.

Also in the image blur correction device 1B having such a configuration, the third guide shaft 38 is used to guide both the first movable frame 3 and the second movable frame 4. Therefore, it is possible to reduce one of four guide shafts used in the related art. Accordingly, there may be no need to ensure a space for placing the fourth guide shaft in the related art, so that the image blur correction device 1B may be reduced in size. As a result, this may contribute to a reduction in size of a lens barrel and an imaging apparatus using the image blur correction device 1B.

FIGS. 16 to 25 show a fourth example of an image blur correction device according to an embodiment of the present invention. The image blur correction device 1C has a configuration similar to that of the image blur correction device 1 showing the first example and differs from the image blur correction device 1 in terms of a first movable frame 53, a second movable frame 54, a fixed base 55 and a guide mechanism 57. Therefore, the same reference symbols are attached to the same parts as those in the image blur correction device 1 and repeated description thereof is omitted here.

As shown in FIGS. 16 to 21, the image blur correction device 1C includes the correction lens 2, the first movable frame 53, the second movable frame 54, the fixed base 55, the driving part 6 and the guide mechanism 57. The first movable frame 53 holds the correction lens 2. The second movable frame 54 supports the first movable frame 53 to be movable in the first direction Y perpendicular to an optical axis of the lens system. The fixed base 55 supports the second movable frame 54 to be movable in the second direction X perpendicular to the optical axis of the lens system and perpendicular to the first direction Y. The driving part 6 includes the first electric actuator 6A and the second electric actuator 6B. The guide mechanism 57 has at least one guide shaft guiding both the first movable frame 53 and the second movable frame 54.

The first movable frame 53 holding the correction lens 2 differs from the first movable frame 3 of the first example only in terms of a shaft engaging part 61. Therefore, the same reference symbols are attached to the same parts as those in the first movable frame 3 and repeated description thereof is omitted here.

The shaft engaging part 61 of the first movable frame 53 is provided in the magnet fixing part 12A. The shaft engaging part 61 is formed as an approximately U-shaped projection protruding from a surface of the magnet fixing part 12A facing the second movable frame 54 and has a pair of engaging pieces 61a and 61b facing each other in a thickness direction of the magnet fixing part 12A. The engaging piece 61b is continuous to a surface of the magnet fixing part 12A facing the second movable frame 54. The shaft engaging part 61 is slidably engaged with a later-described second guide shaft 67.

The second movable frame 54 differs from the second movable frame 4 of the first example only in terms of a third shaft engaging part 62. The second movable frame 54 may not have the second shaft engaging part 32 provided in the second movable frame 4 of the first example. The same reference symbols are attached to the same parts as those in the second movable frame 4 and repeated description thereof is omitted here.

The third main bearing 62 is provided on an edge on the (−) side in the first direction Y of a surface opposite to a surface of the second movable frame 54 facing the first movable frame 53. The third main bearing 62 includes two bearing pieces 62a and 62b. The two bearing pieces 62a and 62b are placed at a predetermined interval between them in the second direction X. A bearing hole 62c penetrating in the second direction X is provided in each of the two bearing pieces 62c and 62b. The later-described second guide shaft 67 is slidably inserted into and rotatably supported by each of the bearing holes 62c.

A first guide shaft 66 is supported by press-fit fixation by the two bearing pieces 33a and 33b of the second main bearing 33 provided in the second movable frame 54. One edge of the first guide shaft 66 forms a protrusion 66a penetrating the bearing piece 33a and protruding at a predetermined distance. The protrusion 66a of the first guide shaft 66 is slidably engaged with a later-described shaft support part 64 of the fixed base 55.

The fixed base 55 differs from the fixed base 5 of the first example in terms of a fourth main bearing 63 and the shaft support part 64. The fixed base 55 may not have the auxiliary bearing 45 and the third guide shaft 38 provided in the fixed base 5 of the first example. Here, the same reference symbols are attached to the same parts as those in the fixed base 5 and repeated description thereof is omitted.

The fourth main bearing 63 is provided on an edge on the (−) side in the first direction Y on a surface of the fixed base 55 facing the first movable frame 53. The fourth main bearing 63 includes two bearing pieces 63a and 63b. The two bearing pieces 63a and 63b are placed at a predetermined interval between them in the second direction X. Both edges of the second guide shaft 67 are supported by the two bearing pieces 63a and 63b by press-fit fixation. The second guide shaft 67 supported by the fourth main bearing 63 extends in the second direction X.

The shaft support part 64 is provided on an edge in a middle between the (+) side in the first direction Y and the (−) side in the second direction X on the surface of the fixed base 55 facing the first movable frame 53. The shaft support part 64 is formed as an approximately U-shaped projection and has a pair of support pieces 64a and 64b facing each other in a thickness direction of the fixed base 55. The support piece 64b is continuous to the surface of the fixed base 55 facing the first movable frame 53. The protrusion 66a of the first guide shaft 66 is slidably supported by the pair of support pieces 64a and 64b of the shaft support part 64.

The guide mechanism 57 includes a first guide mechanism guiding the first movable frame 53 in the first direction Y; and a second guide mechanism guiding the first movable frame 53 in the second direction X through the second movable frame 54.

The first guide mechanism includes the first main bearing 19 and the shaft engaging part 61 of the first movable frame 53; the second main bearing 33 of the second movable frame 54; the fourth main bearing 63 of the fixed base 55; the first guide shaft 66 as a first main shaft; and the second guide shaft 67 as a first auxiliary shaft. The second guide mechanism includes the third main bearing 62 of the second movable frame 54; the fourth main bearing 63 and the shaft support part 64 of the fixed base 55; the second guide shaft 67 as a second main shaft; and the first guide shaft 66 as a second auxiliary shaft.

In the guide mechanism 57 of this example, the first guide shaft 66 serves as a first main shaft guiding the first movable frame 53 in the first direction Y and serves as a second auxiliary shaft guiding the second movable frame 54 in the second direction X. The second guide shaft 67 serves as a second main shaft guiding the second movable frame 54 in the second direction X and serves as a first auxiliary shaft guiding the first movable frame 53 in the first direction Y.

That is, each of the first guide shaft 66 and the second guide shaft 67 is used to guide both the first movable frame 53 and the second movable frame 54. Therefore, it is possible to reduce two of four guide shafts used in the related art. Accordingly, as shown in FIG. 22, it may be not necessary to ensure a space for placing the third and fourth guide shafts in the related art (hatched part S2), enabling the device to be reduced in size. As a result, members forming a lens barrel such as shutter, focus and zoom mechanisms may be placed in the space indicated by the hatched part S2. This may contribute to a reduction of a lens barrel and an imaging apparatus in size.

The image blur correction device 1C having the aforementioned configuration may be assembled as follows, for example. First, the correction lens 2 and the two magnets 21A and 21B are fitted in the fitting hole 13 and the two magnet fitting holes 17 and 18 of the first movable frame 53 and fixed thereto using an adhesive or other fixing methods. Accordingly, a first movable frame assembly is formed with the first movable frame 53, the correction lens 2 and the two magnets 21A and 21B integrated.

Next, the second movable frame 54 is allowed to face one surface of the first movable frame assembly, and the first main bearing 19 of the first movable frame 53 is allowed to be arranged between the two bearing pieces 33a and 33b of the second main bearing 33 of the second movable frame 54. Then, the first guide shaft 66 is allowed to penetrate the bearing holes 19c provided in the bearing pieces 19a and 19b of the first main bearing 19 and the through-holes of the two bearing pieces 33a and 33b and is press-fit fixed to the two bearing pieces 33a and 33b. Here, the protrusion 66a that is one edge of the first guide shaft 66 is allowed to protrude from the bearing piece 19a of the first main bearing 19. Accordingly, the first movable frame 53 is supported by the second movable frame 54 to be movable in the first direction Y which is one specified direction.

Next, as shown in FIG. 21, the first coil 22A and the first hole element 49A are mounted on one surface of the first coil mounting part 48a of the flexible wiring board 48, and the second coil 22B and the second hole element 49B are mounted on one surface of the second coil mounting part 48b of the flexible wiring board 48. Accordingly, a coil assembly is formed with the flexible wiring board 48, the two coils 22A and 22B and the two hole elements 49A and 49B integrated.

Next, the flexible wiring board 48 of the coil assembly is fitted in the wiring board recess 47 of the fixed base 55 and fixed thereto using an adhesive, fixing screws, or other fixing methods. Accordingly, a fixed base assembly is formed with the fixed base 55 and the coil assembly integrated. Here, as shown in FIG. 20, the two coils 22A and 22B and the two hole elements 49A and 49B are inserted into the two coil insertion holes 42 and 43 of the fixed base 55. The steps of forming the fixed base assembly as described above may be performed before the steps of allowing the first movable frame 53 to be movably supported by the second movable frame 54.

Next, the first movable frame 53 supported by the second movable frame 54 is allowed to face the fixed base assembly, and the first guide shaft 66 fixed to and supported by the second movable frame 54 is allowed to be slidably supported by the shaft support part 64 of the fixed base 55. Here, the limiting projection 15 of the first movable frame 53 is inserted into the limiting receiver 41 of the fixed base 55 to limit ranges of movement of the first movable frame 53 and the second movable frame 54.

While the first guide shaft 66 is allowed to be slidably supported by the shaft support part 64, the third main bearing 62 of the second movable frame 54 is allowed to be arranged between the two bearing pieces 63a and 63b of the fourth main bearing 63 of the fixed base 55. Then, the second guide shaft 67 is allowed to penetrate the bearing holes 62c provided in the bearing pieces 62a and 62b of the third main bearing 62 and the through-holes of the two bearing pieces 63a and 63b of the fourth main bearing 63, and both edges of the second guide shaft 67 is press-fit fixed to the two bearing pieces 63a and 63b. Here, the shaft engaging part 61 of the first movable frame 53 is slidably engaged with the second guide shaft 67. Accordingly, the second movable frame 54 is supported by the fixed base 55 to be movable in the second direction X which is one specified direction, completing assembling of the image blur correction device 1. As a result, the image blur correction device 1C is obtained having a configuration as shown in FIGS. 16 to 19.

In this example, in the image blur correction device 1C assembled, the shaft engaging part 61 of the first movable frame 53 and the bearing piece 62b of the second movable frame 54 are set to be kept distant from each other at an appropriate interval between them in the second direction X. This prevents contact (interference) between the first movable frame 53 and the second movable frame 54 when the first movable frame 53 is moved in the first direction Y.

FIG. 23A is a plan view showing a state where the first movable frame 53 is in a reference position and a center of the correction lens 2 corresponds to a center of the limiting receiver 41. FIG. 23B is a bottom view of the same state. As shown in FIG. 23B, ranges of movement of the first movable frame 53 and the second movable frame 54 are determined by engagement of the limiting projection 15 of the first movable frame 53 with the limiting receiver 41 of the fixed base 55.

In the state where the first movable frame 53 is placed in the reference position, the first movable frame 53 and the second movable frame 54 are movable on the (+) side in the second direction X at a distance L from the second stopper surface 41c of the limiting receiver 41 to an outer surface of the limiting projection 15. The distance L is selected to be shorter than a distance N from the shaft engaging part 61 to the bearing piece 63b of the fourth main bearing 63 shown in FIG. 23A. This makes it possible to prevent interference between the shaft engaging part 61 and the bearing piece 63b of the fourth main bearing 63 when the first movable frame 53 is moved to the (+) side in the second direction X through the second movable frame 54.

FIG. 24A is a plan view showing a state where the first movable frame 53 is moved to the (+) side in the first direction Y and the (+) side in the second direction X. FIG. 24B is a bottom view of the same state. The first movable frame 53 provided with thrust directed to the (+) side in the first direction Y and the (+) side in the second direction X is moved to the (+) side in the first direction Y along the first guide shaft 66 and moved to the (+) side in the second direction X through the second movable frame 54 moved along the second guide shaft 67.

In this case, the shaft engaging part 61 of the first movable frame 53 slides to the (+) side in the first direction Y and the (+) side in the second direction X, that is, in an oblique direction while being engaged with the second guide shaft 67, and the first guide shaft 66 supported by and fixed to the second movable frame 54 slides to the (+) side in the second direction X while being engaged with the shaft support part 64. Then, as shown in FIG. 24A, the shaft engaging part 61 approaches the bearing piece 63b of the fourth shaft engaging part 63.

In this example, the distance L on the (+) side in the second direction X from the reference position passed by the first movable frame 53 is set smaller than the distance N between the shaft engaging part 61 and the bearing piece 63b in the reference position (see FIGS. 23A and 23B). This makes it possible to prevent interference between the shaft engaging part 61 and the bearing piece 63b even if the first movable frame 53 is moved to the (+) side in the second direction X and the shaft engaging part 61 approaches the bearing piece 63b. Since the second movable frame 54 is moved to the (+) side in the second direction X together with the first movable frame 53, there is no change in relation in terms of relative position in the second direction X between the shaft engaging part 61 and the bearing piece 62b kept distant from each other at an appropriate interval between them. Thus, the shaft engaging part 61 and the bearing piece 62b may not interfere with each other.

FIG. 25A is a plan view showing a state where the first movable frame 53 is moved to the (−) side in the first direction Y and the (−) side in the second direction X. FIG. 25B is a bottom view of the same state. The first movable frame 53 provided with thrust directed to the (−) side in the first direction Y and the (−) side in the second direction X is moved to the (−) side in the first direction Y along the first guide shaft 66 and moved to the (−) side in the second direction X through the second movable frame 54 moved along the second guide shaft 67.

In this case, the shaft engaging part 61 of the first movable frame 53 slides to the (−) side in the first direction Y and the (−) side in the second direction X, that is, in an oblique direction while being engaged with the second guide shaft 67, and the first guide shaft 66 supported by and fixed to the second movable frame 54 slides to the (−) side in the second direction X while being engaged with the shaft support part 64. As shown in FIG. 25A, the shaft engaging part 61 and the bearing piece 63b of the fourth main bearing 63 may not interfere with each other, because the shaft engaging part 61 is moved away from the bearing piece 63b.

FIG. 26 is a cross-sectional view describing an image blur correction device 1D showing a fifth example of an image blur correction device according to an embodiment of the present invention. The image blur correction device 1D includes a moving coil-type electronic actuator. That is, the two magnets 21A and 21B in the image blur correction device 1C showing the fourth example are arranged on the fixed base 55 in this image blur correction device 1D. The two coils 22A and 22B in the image blur correction device 1C are arranged on the first movable frame 53 in this image blur correction device 1D. The other configuration is the same as that in the image blur correction device 1C of the first example and therefore repeated description is omitted.

Also in the image blur correction device 1D having such a configuration, each of the first guide shaft 66 and the second guide shaft 67 is used to guide both the first movable frame 53 and the second movable frame 54. Therefore, it is possible to reduce two of four guide shafts used in the related art. Accordingly, it may be not necessary to ensure a space for placing the third and fourth guide shafts in the related art, so that the image blur correction device 1D may be reduced in size. As a result, this may contribute to a reduction in size of a lens barrel and an imaging apparatus using the image blur correction device 1D.

FIGS. 27 to 29 show a first example of a lens barrel according to an embodiment of the present invention including the image blur correction device 1 having the aforementioned configuration and action. The lens barrel 80 includes: a lens system 81 having five group lenses with a plurality of lenses placed on an optical axis L; a barrel case 82 fixing the lenses of the lens system 81 or supporting the lenses to be movable; an imaging device (such as a CCD or CMOS image sensor) 84 placed on the optical axis L of the lens system 81 and fixed to the barrel case 82; and the image blur correction device 1 mounted in the barrel case 82 and correcting an image blur in the lens system 81.

As shown in FIG. 27 and FIGS. 28A and 28B, the lens system 81 of the lens barrel 80 is formed as a foldable lens system composed of five group lenses 87 to 91 including five lens groups placed on the optical axis L. In the five group lenses 87 to 91, the first group lens 87 on a front edge includes: a first lens 87A that is an objective lens facing an object; a prism 87B placed opposite to the object of the objective lens 87A; and a second lens 87C facing the prism 87B. The prism 87B is formed of a triangle pole having an isosceles right triangular cross-sectional shape. One of two surfaces of the prism 87B adjacent in positions rotated and displaced at 90° faces the objective lens 87A, and the other surface faces the second lens 87C.

In the first group lens 87, light transmitted through the objective lens 87A and incident on the prism 87B from the one surface is reflected on a reflection surface inclined at 45° to the optical axis L and proceeds in a direction bent at 90°. Then, the bent light is emitted from the other surface and transmitted through the second lens 87C. The transmitted light proceeds toward the second group lens 88 along the optical axis L. The second group lens 88 includes a combination of a third lens 88A and a fourth lens 88B to be movable on the optical axis L. The light transmitted through the second group lens 88 is incident on the third group lens 89.

The third group lens 89 includes a fifth lens fixed to the barrel case 82 of the lens barrel 80. The fourth group lens 90 including a sixth lens is placed behind the third group lens 89. A diaphragm mechanism 92 that may adjust an amount of light passing through the lens system 81 is placed between the fourth group lens 90 and the third group lens 89. The fourth group lens 90 is formed to be movable on the optical axis L. The fifth group lens 91 including a seventh lens 91A and the correction lens 2 is placed behind the fourth group lens 90. The seventh lens 91A in the fifth group lens 91 is fixed to the barrel case 82 of the lens barrel 80. The correction lens 2 is movably placed behind the seventh lens 91A. Further, an imaging device 84 is placed behind the correction lens 2.

The second group lens 88 and the fourth group lens 90 are each independently movable along the optical axis L. Zoom adjustment and focus adjustment may be performed by moving the second group lens 88 and the fourth group lens 90 in a predetermined direction. That is, zoom adjustment may be performed by moving the second group lens 88 and the fourth group lens 90 from wide to tele when zooming. Focus adjustment may be performed by moving the fourth group lens 90 from wide to tele when focusing.

The imaging device 84 is fixed to an imaging device adapter and attached to the barrel case 82 of the lens barrel 80 through the imaging device adapter. An optical filter 94 is placed on one side of the imaging device 84. The image blur correction device 1 having the correction lens 2 is provided between the optical filter 94 and the seventh lens 91A.

The correction lens 2 in a normal state is attached so that its optical axis coincides with the optical axis L of the lens system 81. When an image blur occurs on an image forming surface of the imaging device 84 due to vibration or the like in a camera, the image blur correction device 1 moves the correction lens 2 in two directions perpendicular to the optical axis L (the first direction Y and the second direction X) to correct the image blur on the image forming surface.

Next, an operation of the lens system 81 in the lens barrel 80 to which the image blur correction device 1 is attached will be described with reference to FIG. 29. When the objective lens 87A of the lens system 81 faces an object, light from the object is input into the lens system 81 from the objective lens 87A. Here, the light transmitted through the objective lens 87A is refracted at 90° by the prism 87B. Thereafter, the refracted light goes toward the imaging device 84 along the optical axis L of the lens system 81. That is, the light reflected by the prism 87B and output from the second lens 87C of the first group lens 87 is transmitted through the seventh lens 91A and the correction lens 2 of the fifth group lens 91 through the second group lens 88, the third lens 89 and the fourth lens 90. The light passes through the optical filter 94, forming a corresponding object image on the image forming surface of the imaging device 84.

In this case, without shake or vibration occurred in the lens barrel 80 during photographing, light from the object such as light 86A indicated by a continuous line goes in each of centers of the first group lens 87 to the fifth group lens 91 along the optical axis L. Accordingly, an image is formed in a predetermined position on the image forming surface of the imaging device 84. Therefore, a clear image may be obtained without occurrence of an image blur in such a case.

On the other hand, when shake or vibration occurs in the lens barrel 80 during photographing, light from the object is incident on the first group lens 87 as inclined light such as light 86B indicated by an alternate long and short dash line or light 86C indicated by a broken line. Such incident light 86B or 86C is transmitted through each of the first group lens 87 to the fifth group lens 91 as deviated from the optical axis L. However, the shake or the like may be corrected by moving the correction lens 2 in a predetermined amount in response to the shake or the like. Accordingly, an image may be formed in a predetermined position on the image forming surface of the imaging device 84, and an image blur may be eliminated to obtain a clear image.

An image blur detector detects shake, vibration or the like in the lens barrel 80. A gyro sensor may be used as the image blur detector, for example. The gyro sensor is mounted in a camera together with the lens barrel 80. The gyro sensor detects an acceleration, an angular velocity, an angular acceleration or the like acting on the lens barrel 80 due to trembling, shaking or the like of hands of a photographer. Information such as the acceleration or angular velocity detected by the gyro sensor is supplied to a control device.

The first electric actuator 6A and/or the second electric actuator 6B is driven and controlled so that an image is formed in a predetermined position on the image forming surface of the imaging device 84. Specifically, the first electric actuator 6A is driven and controlled in response to the shake in the first direction Y, moving the first movable frame 3 in the first direction Y. The second electric actuator 6B is driven and controlled in response to the shake in the second direction X, moving the first movable frame 3 in the second direction X.

In this example, the lens barrel 80 in which the image blur correction device 1 is mounted includes a foldable lens system; however, a lens barrel according to an embodiment of the present invention is not limited thereto. A lens barrel according to an embodiment of the present invention may include a lens system having an optical axis directed in a horizontal direction, or may be a collapsible lens barrel which includes such direct-acting lens system with the objective lens 87A side movable forward and backward within a predetermined range, for example.

FIGS. 30 to 33 show a digital still camera 100 showing a first example of an imaging apparatus including the lens barrel 80 having the aforementioned configuration. The digital still camera 100 uses a semiconductor recording medium as an information recording medium. In the digital still camera 100, an imaging device (such as a CCD or CMOS image sensor) converts an optical image of an object into an electric signal. Accordingly, in the digital still camera 100, imaging information obtained by the imaging device may be recorded in the semiconductor recording medium or displayed in a display such as a liquid crystal display.

The digital still camera 100 includes a camera main body 101 showing a specific example of an imaging apparatus main body; the lens barrel 80 capturing object-image light and guiding the light to the imaging device 84; a display 102 formed of a liquid crystal display or the like displaying an image based on a video signal output from the imaging device 84; a control device controlling an operation of the lens barrel 80, display in the display 102, and the like; and a battery power supply (not shown).

As shown in FIG. 30, the camera main body 101 is a horizontally long flat cylinder. The camera main body 101 includes a front case 105 and a rear case 106 superposed on each other in the front-back direction (i.e. thickness direction of the camera main body 101); a main frame 107 dividing a space formed with the front case 105 and the rear case 106 in the thickness direction; and a lens cover 108 attached to a first main surface, which is a front surface of the front case 105, to be slidable in a vertical direction. The objective lens 87A of the lens barrel 80 faces a front surface (first main surface) of the main frame 107. The objective lens 87A can be exposed and covered by the lens cover 108.

The objective lens 87A is placed in an upper part on one side of the main frame 107. The lens barrel 80 is attached to the camera main body 101 in a state where the imaging device 84 is on the bottom and a second optical axis L2 shown in FIG. 27 is directed in a vertical direction. Further, a first optical axis L1 of the lens system 81 shown in FIG. 27 extends in the thickness direction. Accordingly, the first electric actuator 6A and the second electric actuator 6B that are lens driving parts of the image blur correction device 1 are placed in the camera main body 101 in a direction perpendicular to the second optical axis L2. A control device (not shown) formed by mounting predetermined electric components or the like such as a microcomputer, a resistance and a capacitor on a wiring board; a flash device 110; and the like are attached to the main frame 107.

The control device is arranged adjacent to the lens barrel 80, and the flash device 110 is placed above them. The flash device 110 includes a light emitting part exposed on the front surface of the front case 105; a driving part driving and controlling the light emitting part; and a capacitor supplying predetermined power to the driving part. In order to expose the light emitting part of the flash device 110 and the objective lens 87A, a lens fitting hole 111a and a flash fitting hole 111b are provided in corresponding positions in the front case 105. A decorative plate 96 and the objective lens 87A are fitted in the lens fitting hole 111a, and the light emitting part of the flash device 110 is fitted in the flash fitting hole 111b.

Further, the front case 105 has a plurality of opening holes (not shown) into which a plurality of leg pieces provided in the lens cover 108 are inserted. The lens cover 108 has the plurality of leg pieces each provided with a dropout prevention part to prevent dropout of the lens cover 108 from the front case 105. The lens cover 108 may be moved in a vertical direction using the plurality of opening holes and may be locked on upper and lower edges using a lock mechanism (not shown). As shown in FIG. 30, the objective lens 87A is completely covered when the lens cover 108 is on the upper edge. Accordingly, the objective lens 87A is protected. On the other hand, as shown in FIG. 31, when the lens cover 108 is moved to the lower edge, the objective lens 87A is completely exposed and a power supply switch is turned on to carry out photographing.

As shown in FIG. 32, the rear case 106 has a quadrangular opening window 112 to expose a display surface of the display 102. The opening window 112 is formed as a large opening on a rear surface that is a second main surface of the rear case 106. The display 102 is placed inside the opening window 112. The display 102 is formed of a combination of a liquid crystal display having a size corresponding to the opening window 112 and a backlight superposed on an inner surface of the liquid crystal display. A protection plate is placed on the liquid crystal display of the display 102 through a sealing frame (not shown). A periphery of the protection plate is brought into contact with an inner surface of the opening window 112.

Further, the rear case 106 has various operation switches. The operation switches include, for example, a mode selection knob 115 selecting a function mode (still image, video, reproduction, etc.); a zoom button 116 performing a zoom operation; a screen display button 117 displaying images on a screen; a menu button 118 selecting various menus; a direction key 119 moving a cursor or the like selecting a menu; and a screen button 121 switching a screen size and deleting an image. The switches are arranged in appropriate positions. A speaker hole 122 is opened on an edge of the rear case 106 on the left side of the display 102. A speaker is built in the speaker hole 122. A strap support fitting 123 is attached to an edge of the rear case 106 opposite the above edge.

As shown in FIG. 33, there are provided, on an upper surface of the camera main body 101, a power supply button 125 turning the power supply on and off; a photographing button 126 starting or stopping photographing; and a shake setting button 127 performing image blur correction by operating the image blur correction device 1 when shake occurs. Further, a microphone hole 128 is opened in an approximate center on the upper surface of the camera main body 101, and a microphone is built in the hole. The power supply button 125, the photographing button 126 and the shake setting button 127 are attached to a switch holder 124 mounted in the camera main body 101. The microphone hole 128 is also opened in the switch holder 124. The built-in microphone is fixed to the switch holder 124. The camera main body 101 holds the switch holder 124 with a part of the switch holder 124 being sandwiched between the front case 105 and the rear case 106.

FIG. 34 is a block diagram for describing a control concept in the aforementioned image blur correction device 1. A control part 130 includes an image blur correction computing part 131, an analog servo 132, a driving circuit 133 and four amplifiers (AMP) 134A, 134B, 135A and 135B. A first gyro sensor 136A is connected to the image blur correction computing part 131 through the first amplifier (AMP) 134A. A second gyro sensor 136B is also connected to the image blur correction computing part 131 through the second amplifier (AMP) 134B.

The first gyro sensor 136A detects an amount of displacement in the first direction Y due to shake or the like applied to the camera main body 101. The second gyro sensor 136B detects an amount of displacement in the second direction X due to shake or the like applied to the camera main body 101. In this example, two gyro sensors are provided to detect an amount of displacement in the first direction Y and an amount of displacement in the second direction X individually; however, it is obviously possible to detect amounts of displacement in the first direction Y and the second direction X using one gyro sensor.

The analog servo 132 is connected to the image blur correction computing part 131. The analog servo 132 converts a digital value calculated by the image blur correction computing part 131 into an analog value and outputs a control signal corresponding to the analog value. The driving circuit 133 is connected to the analog servo 132. The first hole element 49A as a first position detector is connected to the driving circuit 133 through the third amplifier (AMP) 135A. The second hole element 49B as a second position detector is also connected to the driving circuit 133 through the fourth amplifier (AMP) 135B. Further, the first coil 22A of the first electric actuator 6A and the second coil 22B of the second electric actuator 6B are connected to the driving circuit 133, respectively.

An amount of displacement of the movable frame 3 in the first direction Y detected by the first hole element 49A is input to the driving circuit 133 through the third amplifier 135A. An amount of displacement of the movable frame 3 in the second direction X detected by the second hole element 49B is input to the driving circuit 133 through the fourth amplifier 135B. The driving circuit 133 outputs predetermined current to one or both of the first coil 22A and the second coil 22B to move the correction lens 2 for image blur correction, based on these input signals and a control signal from the analog servo 132.

FIG. 35 is a block diagram showing a first example of a schematic configuration of the digital still camera 100 including the image blur correction device 1 having the aforementioned configuration and action. The digital still camera 100 includes the lens barrel 80 having the image blur correction device 1; a control part 140 serving as a main part of the control device; a storage 141 having RAM and ROM such as a program memory and data memory to drive the control part 140; an operation part 142 inputting various command signals for turning the power on and off, selecting a photographing mode or photographing, for example; the display 102 displaying a photographed image; and an external memory 143 for a large storage capacity.

The control part 140 includes a computing circuit having a microcomputer (CPU), for example. The storage 141, the operation part 142, an analog signal processing part 144, a digital signal processing part 145, two A/D converters 146 and 147, a D/A converter 148 and a timing generator (TG) 149 are connected to the control part 140. The analog signal processing part 144 is connected to the imaging device 84 attached to the lens barrel 80. The analog signal processing part 144 performs predetermined signal processing using an analog signal corresponding to a photographed image output from the imaging device 84. The analog signal processing part 144 is connected to the first A/D converter 146. The A/D converter 146 converts the analog signal into a digital signal.

The digital signal processing part 145 is connected to the first A/D converter 146. The digital signal processing part 145 performs predetermined signal processing based on the digital signal supplied from the first A/D converter 146. The display 102 and the external memory 143 are connected to the digital signal processing part 145. An object image is displayed in the display 102 or stored in the external memory 143 based on the digital signal output from the digital signal processing part 145. A gyro sensor 136 as a blur detection part is connected to the second A/D converter 147. The gyro sensor 136 detects vibration, shake, or the like of the camera main body 101, and image blur correction is performed in response to the detection result.

A driving control part 152 as a servo computing part for image blur correction is connected to the D/A converter 148. The driving control part 152 drives and controls the image blur correction device 1 in response to a position of the correction lens 2 to correct an image blur. The first hole element 49A and the second hole element 49B as position detection parts are connected to the driving control part 152. The first hole element 49A and the second hole element 49B detect a position of the movable frame 3 of the image blur correction device 1 to detect a position of the correction lens 2. The timing generator (TG) 149 is connected to the imaging device 84.

An image of the object is formed on the image forming surface of the imaging device 84 with image-light input to the lens system 81 of the lens barrel 80. Then, an image signal thereof is output as an analog signal, subjected to predetermined processing at the analog signal processing part 144 and then converted into a digital signal at the first A/D converter 146. The output from the first A/D converter 146 is subjected to predetermined processing performed at the digital signal processing part 145 and then displayed in the display 102 as an image corresponding to the object or stored in the external memory 143 as stored information.

In such a photographing state, when the camera main body 101 receives vibration, shake, or the like with the image blur correction device 1 being operated, the gyro sensor 136 detects the vibration, shake, or the like and outputs its detection signal to the control part 140. The control part 140 performs predetermined arithmetic processing upon receiving the detection signal. The control part 140 outputs a control signal controlling an operation of the image blur correction device 1 to the driving control part 152. The driving control part 152 outputs a predetermined driving signal to the image blur correction device 1 upon receiving the control signal from the control part 140. The image blur correction device 1 moves the movable frame 3 in a predetermined amount in the first direction Y and/or the second direction X. Accordingly, an image blur is eliminated by moving the correction lens 2 and a clear image may be obtained.

FIG. 36 is a block diagram showing a second example of a schematic configuration of the digital still camera 100 including the image blur correction device 1 having the aforementioned configuration and action. The digital still camera 100A includes the lens barrel 80 having the image blur correction device 1. Further, the digital still camera 100A includes a video recording/reproduction circuit 160 serving as a main part of the control device; a built-in memory 161 having RAM and ROM such as a program memory and data memory to drive the video recording/reproduction circuit 160; a video signal processing part 162 processing a photographed video or the like into a predetermined signal; a display 163 displaying the photographed video or the like; an external memory 164 for a large storage capacity; and a correction lens control part 165 driving and controlling the image blur correction device 1.

The video recording/reproduction circuit 160 includes a computing circuit having a microcomputer (CPU), for example. The built-in memory 161, the video signal processing part 162, the correction lens control part 165, a monitor driving part 166, an amplifier 167 and three interfaces (I/F) 171, 172 and 173 are connected to the video recording/reproduction circuit 160. The video signal processing part 162 is connected to the imaging device 84 attached to the lens barrel 80 through the amplifier 167. A signal processed into a predetermined video signal is input to the video recording/reproduction circuit 160.

The display 163 is connected to the video recording/reproduction circuit 160 through the monitor driving part 166. A connector 168 is connected to the first interface (I/F) 171. The external memory 164 may be detachably connected to the connector 168. A connection terminal 174 is connected to the second interface (I/F) 172 provided in the camera main body 101.

An acceleration sensor 175 as a blur detection part is connected to the correction lens control part 165 through the third interface (I/F) 173. The acceleration sensor 175 detects displacement due to vibration, shake or the like applied to the camera main body 101 as an acceleration. A gyro sensor may be used as the acceleration sensor 175. The first electric actuator 6A and the second electric actuator 6B as lens driving parts in the image blur correction device 1 that drives and controls the correction lens 2 are connected to the correction lens control part 165. The two hole elements 49A and 49B as position sensors detecting a position of the correction lens 2 are also connected to the correction lens control part 165.

An image of the object is formed on the image forming surface of the imaging device 84 with image-light input to the lens system 81 of the lens barrel 80. Then, the image signal is input to the video signal processing part 162 through the amplifier 167. The signal processed into a predetermined video signal at the video signal processing part 162 is input to the video recording/reproduction circuit 160. Accordingly, a signal corresponding to the image of the object is output to the monitor driving part 166, the built-in memory 161 or the external memory 164 from the video recording/reproduction circuit 160. As a result, an image corresponding to the object is displayed in the display 163 through the monitor driving part 166 or recorded in the built-in memory 161 or the external memory 164 as an information signal as necessary.

In such a photographing state, when the camera main body 101 receives vibration, shake or the like with the image blur correction device 1 being operated, the acceleration sensor 175 detects the vibration, shake, or the like. Then, the detection signal is output to the video recording/reproduction circuit 160 through the correction lens control part 165. The video recording/reproduction circuit 160 performs predetermined arithmetic processing upon receiving the signal. The video recording/reproduction circuit 160 outputs a control signal controlling an operation of the image blur correction device 1 to the correction lens control part 165. The correction lens control part 165 outputs a predetermined driving signal to the image blur correction device 1 upon receiving the control signal from the video recording/reproduction circuit 160. The image blur correction device 1 moves the movable frame 3 in a predetermined amount in the first direction Y and/or the second direction X. Accordingly, an image blur is eliminated by movement of the correction lens 2 and a clear image may be obtained.

As described above, according to an image blur correction device, a lens barrel or an imaging apparatus according to an embodiment of the present invention, a guide mechanism is formed having a third guide shaft guiding both a first movable frame and a second movable frame, making it possible to reduce the number of guide shafts. As a result, an image blur correction device may be reduced in size. This may contribute to a reduction in size of a lens barrel and an imaging apparatus using the image blur correction device. Moreover, since the number of components is reduced, the device is reduced in weight, and the number of assembly steps may be reduced to decrease the cost.

The third guide shaft is fixed to and supported by a fixed base. Therefore, only one auxiliary guide shaft may cause backlash in a clearance between an auxiliary guide shaft and auxiliary guide bearings in a space between a shaft engaging part of the first movable frame and the fixed base, as compared to a case of the related art where auxiliary guide shafts are provided in a first direction and a second direction, respectively. Accordingly, variations in dimensions generated between another auxiliary guide shaft and auxiliary guide bearings may be eliminated, making it possible to improve accuracy of inclination of the first movable frame, that is, a correction lens to an optical axis and accuracy of position of the correction lens in an optical axis direction. As a result, highly precise image blur correction may be performed while suppressing deterioration of optical characteristics.

Further, the third guide shaft is placed opposite a first guide shaft and a second guide shaft across the correction lens. This makes it possible to suppress backlash in the first and second movable frames generated by a clearance between the first and second guide shafts and respective bearing pieces or a clearance between the third guide shaft and the two shaft engaging parts. As a result, an inclination of the correction lens to the optical axis may be reduced to realize image blur correction with high accuracy.

In the image blur correction device described in the fourth example, the third guide shaft of the first example is also eliminated and a guide mechanism is formed having a first guide shaft and a second guide shaft each guiding both a first movable frame and a second movable frame. Therefore, variations in a degree of parallelization and a position relative to an optical axis, which occurred in the related art between an auxiliary guide shaft and a main guide shaft in a first direction and between an auxiliary guide shaft and a main guide shaft in a second direction may be eliminated. Accordingly, highly precise image blur correction may be performed while suppressing deterioration of optical characteristics. The third guide shaft is eliminated, so that an image blur correction device may be reduced in size. This may contribute to a reduction in size of a lens barrel and an imaging apparatus using the image blur correction device. Moreover, the number of components may be reduced to decrease the device in weight, and the number of assembly steps may be reduced to decrease the cost.

The present invention is not limited to the examples described above and shown in the drawings, and various modifications may be effected without departing from the gist of the present invention. For example, the present invention is applied to a digital still camera as an imaging apparatus in the aforementioned examples; however, the present invention may also be applied to other imaging apparatuses such as a digital video camera, a personal computer with a camera, and a mobile phone unit with a camera. Further, a lens barrel includes five group lenses; however, the lens barrel may include four or less group lenses or six or more group lenses.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correction device comprising:
   a correction lens configured to correct an image blur in a lens system;
   a first movable frame holding the correction lens;
   a second movable frame supporting the first movable frame to be movable in a first direction perpendicular to an optical axis of the lens system;
   a fixed base supporting the second movable frame to be movable in a second direction perpendicular to the optical axis of the lens system and perpendicular to the first direction;
   a driving part moving the first movable frame in the first direction and moving the second movable frame in the second direction; and
   a guide mechanism having at least one guide shaft guiding both the first movable frame and the second movable frame,
   wherein the guide mechanism includes:
      a first guide shaft guiding the first movable frame in the first direction;
      a second guide shaft guiding the second movable frame in the second direction;
      a first shaft engaging part provided in the first movable frame; and
      a third guide shaft guiding the second movable frame in the second direction and allowing the first shaft engaging part to be slidably engaged therewith in a direction perpendicular to the optical axis of the lens system.

2. An image blur correction device according to claim 1, wherein
   the second movable frame includes a second shaft engaging part slidably engaged with the third guide shaft.

3. An image blur correction device according to claim 1, wherein
   the first guide shaft and the second guide shaft are placed in positions rotated and displaced at about 90° to each other around the correction lens as a center, and the third guide shaft is placed opposite the first guide shaft and the second guide shaft across the correction lens.

4. An image blur correction device according to claim 1, wherein
   the third guide shaft extends in a direction at about 45° to the first direction and the second direction.

5. An image blur correction device comprising:
   a correction lens configured to correct an image blur in a lens system;
   a first movable frame holding the correction lens;
   a second movable frame supporting the first movable frame to be movable in a first direction perpendicular to an optical axis of the lens system;
   a fixed base supporting the second movable frame to be movable in a second direction perpendicular to the optical axis of the lens system and perpendicular to the first direction;
   a driving part moving the first movable frame in the first direction and moving the second movable frame in the second direction; and
   a guide mechanism having at least one guide shaft guiding both the first movable frame and the second movable frame,
   wherein the guide mechanism includes:
   a shaft engaging part provided in the first movable frame;
   a shaft support part provided in the fixed base;
   a first guide shaft guiding the first movable frame in the first direction and slidably supported by the shaft support part in a direction perpendicular to the optical axis of the lens system; and
   a second guide shaft guiding the second movable frame in the second direction and allowing the shaft engaging part to be slidably engaged therewith in a direction perpendicular to the optical axis of the lens system.

6. An image blur correction device for use in an imaging device having an optical axis, said image blur correction device comprising:
- a first movable frame;
- a second movable frame,
- wherein the second movable frame supports the first movable frame to be movable in a first direction perpendicular to the optical axis;
- a fixed base supporting the second movable frame to be movable in a second direction perpendicular to the optical axis and perpendicular to the first direction;
- a driving part moving the first movable frame in the first direction and moving the second movable frame in the second direction; and
- a guide mechanism having at least one guide shaft guiding both the first movable frame and the second movable frame, wherein the guide mechanism includes:
- a first guide shaft guiding the first movable frame in the first direction;
- a second guide shaft guiding the second movable frame in the second direction;
- a first shaft engaging part provided in the first movable frame; and
- a third guide shaft guiding the second movable frame in the second direction and allowing the first shaft engaging part to be slidably engaged therewith in a direction perpendicular to the optical axis of the lens system.

* * * * *